US012747748B2

(12) United States Patent
Siemer, Jr. et al.

(10) Patent No.: US 12,747,748 B2
(45) Date of Patent: Sep. 29, 2026

(54) RETRACTING PINS FOR SECUREMENT DEVICES

(71) Applicant: Harken, Incorporated, Pewaukee, WI (US)

(72) Inventors: Richard H. Siemer, Jr., Bellingham, WA (US); Eric Warmenhoven, Bellingham, WA (US)

(73) Assignee: Harken, Incorporated, Pewaukee, WI (US)

( * ) Notice: Subject to any disclaimer, the term of this patent is extended or adjusted under 35 U.S.C. 154(b) by 174 days.

(21) Appl. No.: 18/482,207

(22) Filed: Oct. 6, 2023

(65) Prior Publication Data

US 2024/0117833 A1 Apr. 11, 2024

Related U.S. Application Data

(60) Provisional application No. 63/378,693, filed on Oct. 7, 2022.

(51) Int. Cl.
*F16B 21/12* (2006.01)

(52) U.S. Cl.
CPC .................................... *F16B 21/12* (2013.01)

(58) Field of Classification Search
CPC .............. A62B 35/0043; A62B 35/005; A62B 35/0056; A62B 35/0062; A62B 35/0068; A62B 35/0075; A62B 35/0081; A62B 35/0087; F16B 21/00; F16B 21/02; F16B 21/04; F16B 21/06; F16B 21/08; F16B 21/082; F16B 21/084; F16B 21/086; F16B 21/088; F16B 21/09; F16B 21/10; F16B 21/12; F16B 21/125; F16B 21/14; F16B 21/16; F16B 21/165; F16B 21/18; F16B 21/183; F16B 21/186; F16B 45/015; F16B 45/04; F16B 45/045; F16B 45/049;

(Continued)

(56) References Cited

U.S. PATENT DOCUMENTS 7,540,140 B1 * 6/2009 Diaz ........................ F16G 15/06
70/52
8,938,864 B2 * 1/2015 Casebolt ................ A44B 11/04
294/82.23

(Continued)

FOREIGN PATENT DOCUMENTS

EP 3552675 A1 * 10/2019 ............. F16H 55/50

*Primary Examiner* — Joshua E Rodden
(74) *Attorney, Agent, or Firm* — Brian G. Gilpin; Godfrey & Kahn, S.C.

(57) ABSTRACT

A securement device is disclosed to aid in the movement or suspension of equipment or people through the air or along inclined surfaces using rope, cable, wire, or similar component and associated lifting, winching, lowering devices, mechanical advantage systems or manual power by retaining a system component between a yoke and a load pin using a load pin assembly. The load pin is biased into a locked position through the use of a biasing member but may be moved from a locked position to a retracted position by journaling a lock pin through a lock slot. Some embodiments restrict movement of the load pin using a track pin and a track slot, while other embodiments use the interaction of a lock ring and a keyed recess formed in the yoke. The securement device may be incorporated as part of a rigging plate.

9 Claims, 33 Drawing Sheets

(58) Field of Classification Search
CPC .... F16B 45/051; F16B 45/053; F16B 45/059; F16B 45/06
USPC .......................................................... 403/324
See application file for complete search history.

(56) References Cited

U.S. PATENT DOCUMENTS

| | | | | |
|---|---|---|---|---|
| 9,435,484 | B1 * | 9/2016 | Yang .................. | A62B 35/0075 |
| 10,143,866 | B2 * | 12/2018 | Yang .................. | A62B 35/0025 |
| 10,625,105 | B2 * | 4/2020 | Hetrich .............. | A62B 35/0043 |
| 2006/0099838 | A1 * | 5/2006 | Meyers ................... | E02F 9/006 439/134 |
| 2019/0070443 | A1 * | 3/2019 | Hetrich .............. | A62B 35/0037 |
| 2019/0376254 | A1 * | 12/2019 | Stolz ......................... | E02F 3/58 |

* cited by examiner 106
107
150
145
170
155
107
170
140
120
160
106
150
120
140
145

106
150
170
145
107
170
155
140
107
120
160
170
106
150
170
120
140
145

106
150
170
145
107
155
170
107
140
120
160
170
106
150
120
170
140
145

150
106
145
107
170
155
170
107
140
120
160
170
170
106
150
160
140
120
145

RETRACTING PINS FOR SECUREMENT DEVICES

CROSS-REFERENCE TO RELATED APPLICATION AND PRIORITY CLAIM

This application claims the benefit of and priority to U.S. provisional patent application Ser. No. 63/378,693 filed on Oct. 7, 2022, the disclosure of which is incorporated herein by reference for all purposes.

FIELD OF THE INVENTION

The invention relates generally to retracting pins. More particularly, the invention relates to retracting pins used with rigging plates and other securement devices.

SUMMARY

In at least some of the embodiments, a securement device is provided that includes a body with an upper portion and a lower portion; a locking assembly positioned at the lower portion of the body comprising: a load pin positioned within a yoke configured to accept a system component and secured in place by the interaction of a lock pin and a lock slot; and a track pin positioned in a track slot formed along the load pin, securing the load pin on an end opposite the lock pin; wherein a biasing member is configured to bias the load pin in a locked position and the load pin able to move into a retracted position by moving the track pin through the track slot.

In at least some of the embodiments, the securement device has a second locking assembly, comprising: a second load pin positioned within a second yoke configured to accept the system component and secured in place by the interaction of a second lock pin and a second lock slot; and a second track pin positioned in a second track slot formed along the second load pin, securing the second load pin on an end opposite the second lock pin; wherein the biasing member is configured to bias the second load pin in a locked position and the second load pin able to move into a retracted position by moving the second track pin through the second track slot.

In at least some of the embodiments, the load pin and the second load pin are positioned along the same axis, and the biasing member is configured to bias both the load pin and the second load pin in a locked position. In some of the embodiments, the load pin and the second load pin are positioned along the same axis, and a second biasing member is configured to bias the second load pin in a locked position and the second load pin able to move into a retracted position by moving the second track pin through the second track slot.

In at least some of the embodiments, the securement device has a series of linearly arranged holes along the upper portion of the securement device to form a rigging plate. In some of the embodiments, the lock slot is generally J-shaped and includes a first axial portion, a radial portion, and a second axial portion. In some of the embodiments, the biasing member is a spring. In some of the embodiments, the load pin is secured in place by the interaction of a second lock pin and a second lock slot. In some of the embodiments, the load pin has a pin cap secured to the end of the load pin opposite the lock pin. In some of the embodiments, yoke has a locking leg and a tracking leg, wherein the lock pin is secured to the locking leg and the track pin is secured to the tracking leg.

In at least some of the embodiments, a securement device is provided that includes a body with an upper portion and a lower portion; a locking assembly positioned at the lower portion of the body comprising: a load pin positioned within a yoke configured to accept a system component and secured in place by the interaction of a lock pin and a lock slot; and a lock ring positioned over a portion of the load pin configured to prevent rotation of the load pin when within a recess formed in the body of the rigging plate; wherein a biasing member biases the lock ring in the recess and the load pin may be moved from a locked position to a retracted position by moving the lock pin through the lock slot.

In at least some of the embodiments, the securement device has a second locking assembly positioned at the lower portion of the body comprising: a second load pin positioned within a yoke configured to accept a system component and secured in place by the interaction of a second lock pin and a second lock slot; and a second lock ring positioned over a portion of the second load pin configured to prevent rotation of the second load pin when within a second recess formed in the body of the rigging plate; wherein a second biasing member is configured to bias the second lock ring into the second recess and the second load pin may be moved from a locked position to a retracted position by moving the second lock pin through the second lock slot.

In some of the embodiments, the securement device has a sleeve partially positioned over the lock ring and configured to allow translation of the lock ring out of the recess. In some of the embodiments, the securement device includes a second biasing member is configured to bias the sleeve against the body of the rigging plate. In some embodiments, the securement device has a series of linearly arranged holes along the upper portion of the securement device to form a rigging plate. In some of the embodiments, the lock slot is generally L-shaped and includes an axial portion and a radial portion. In some of the embodiments, the biasing member is a spring. In some of the embodiments, the load pin is secured in place by the interaction of a second lock pin and a second lock slot. In some of the embodiments, the lock ring is configured to extend outward from the sleeve when the load pin is in a retracted position.

It will be understood by those skilled in the art that one or more aspects of this invention can meet certain objectives, while one or more other aspects can lead to certain other objectives. In particular, where references are made to a "rigging plate," it should be noted that the invention can be incorporated into any type of securement device. Other objects, features, benefits, and advantages of the invention will be apparent in this summary and descriptions of the disclosed embodiments, and will be readily apparent to those skilled in the art. Such objects, features, benefits, and advantages will be apparent from the above as taken in conjunction with the accompanying figures and all reasonable inferences to be drawn therefrom.

BRIEF DESCRIPTION OF THE DRAWINGS

Embodiments of the subject rigging plate are disclosed with reference to the accompanying drawings and are for illustrative purposes only. The rigging plate is not limited in application to the details of construction or arrangement of the components as illustrated in the drawings. The rigging plate is capable of other embodiments or of being practiced or carried out in other various ways and the rigging plate could be used in other environments or scenarios where its mechanical characteristics are desired.

DETAILED DESCRIPTION

Figure 1:
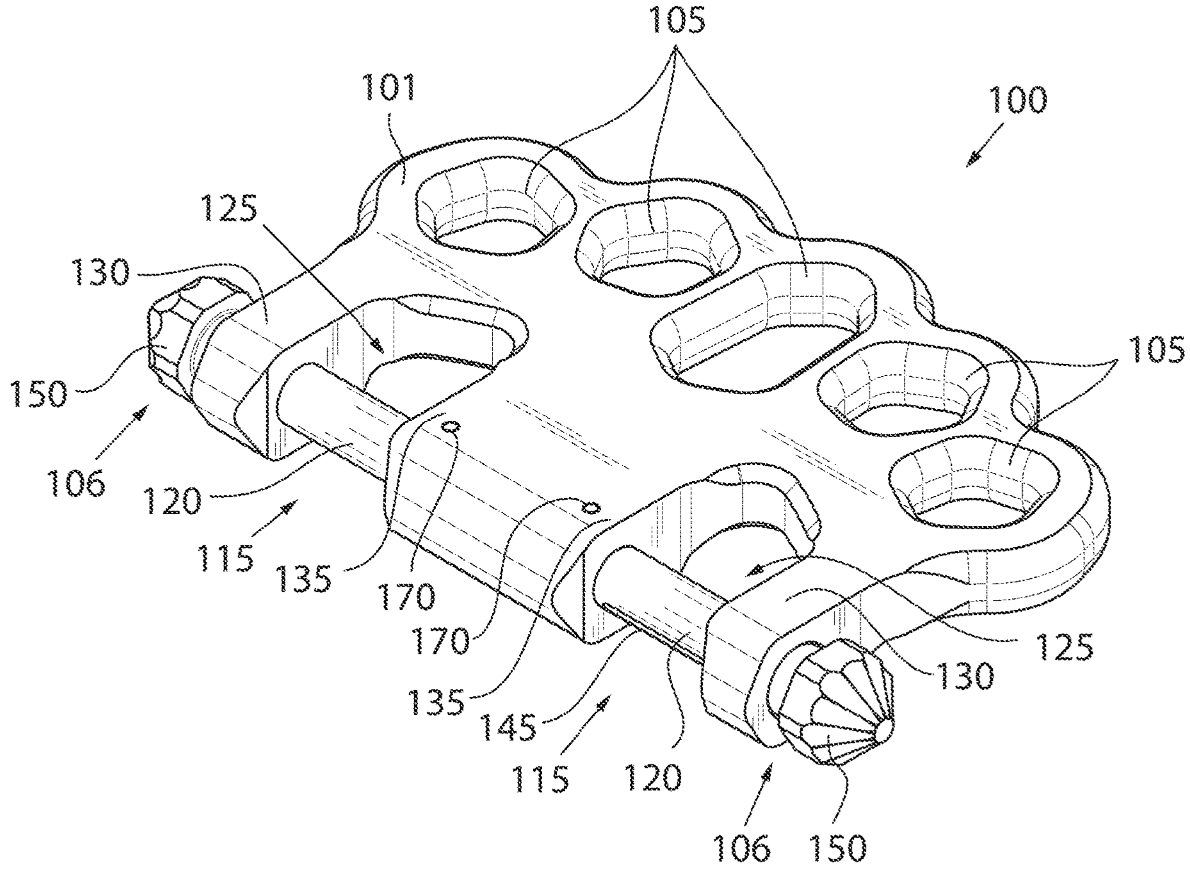
FIG. 1 is a perspective view of an exemplary embodiment of a rigging plate with retracting pins.
Figure 2:
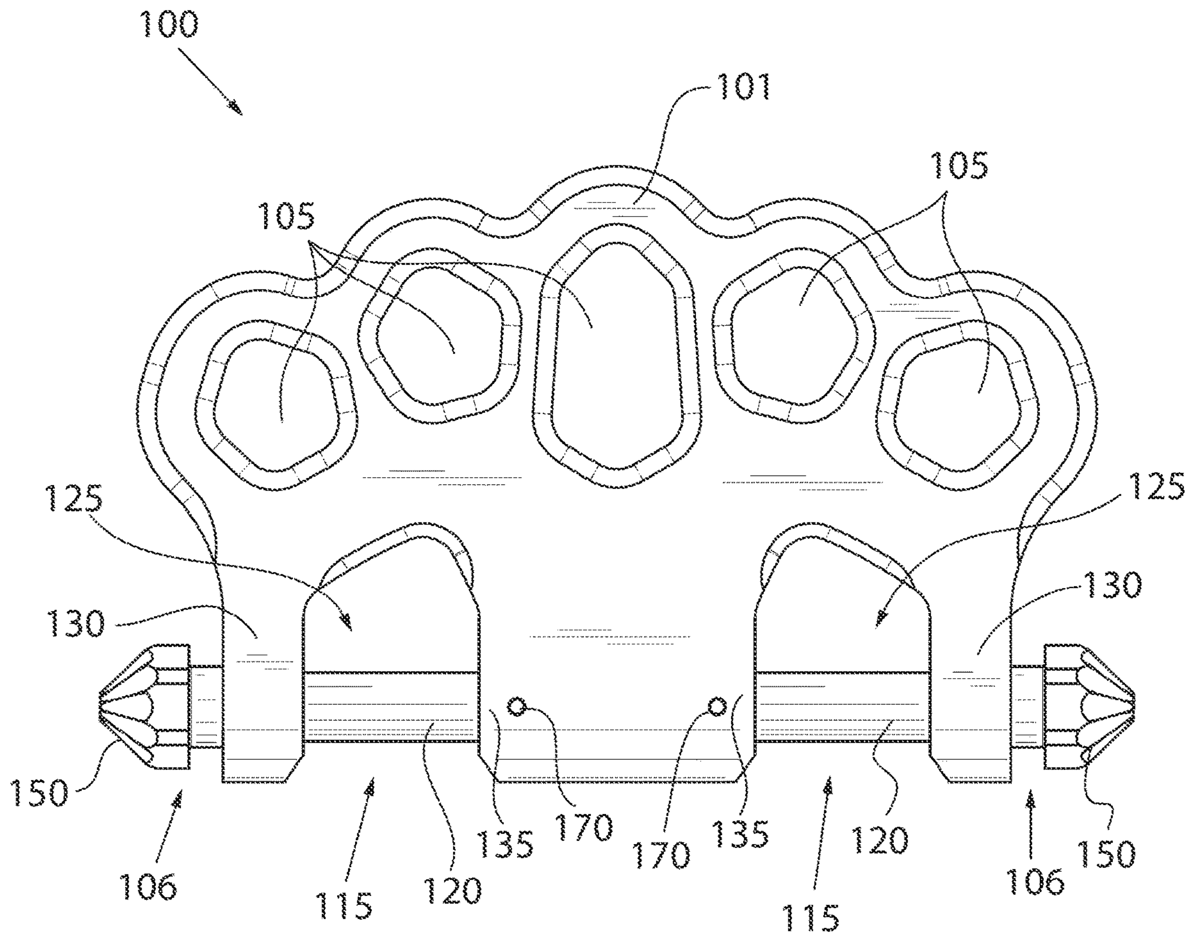
FIG. 2 is a projected front view of the rigging plate of FIG. 1.
Figure 3:
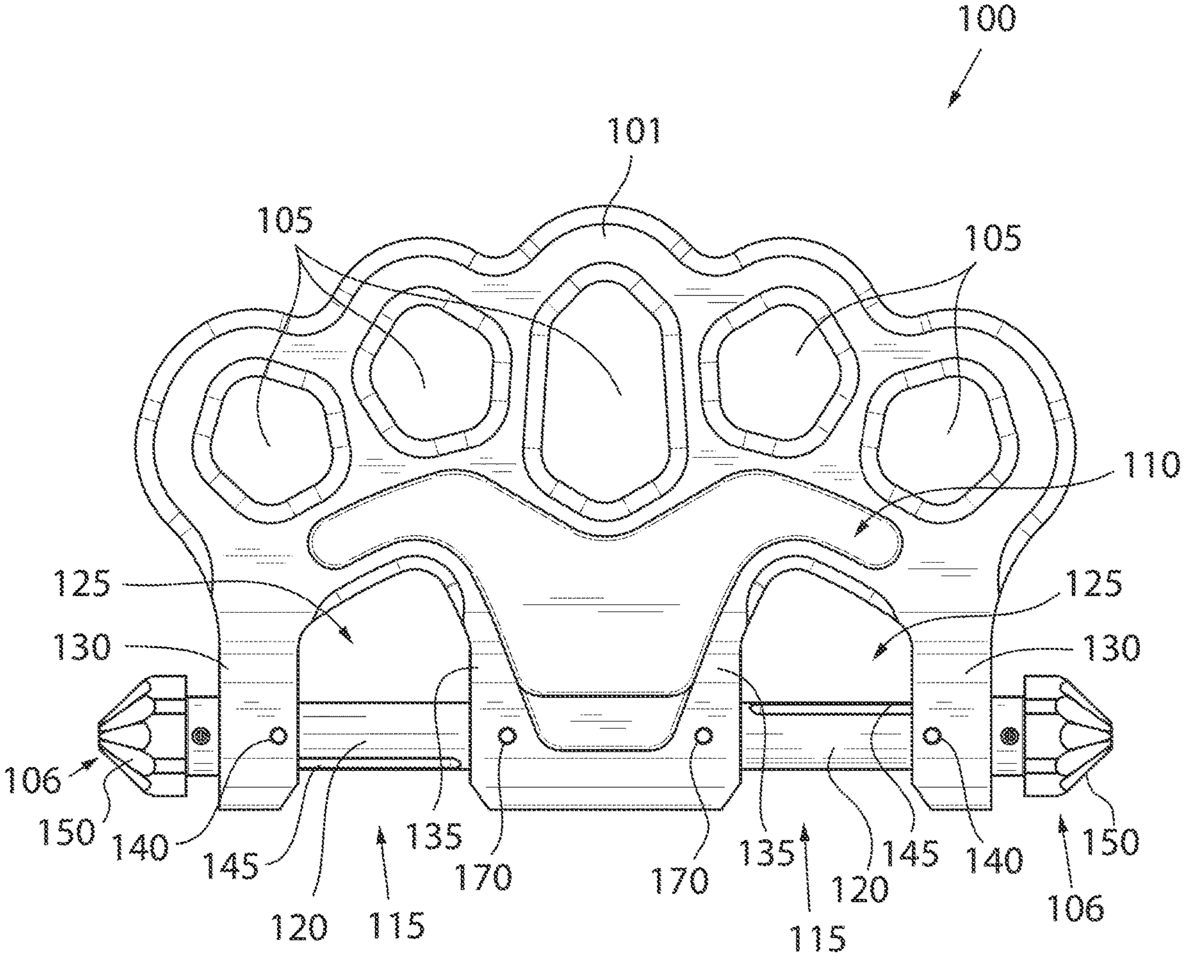
FIG. 3 is a projected rear view of the rigging plate of FIG. 1.
Figure 4:
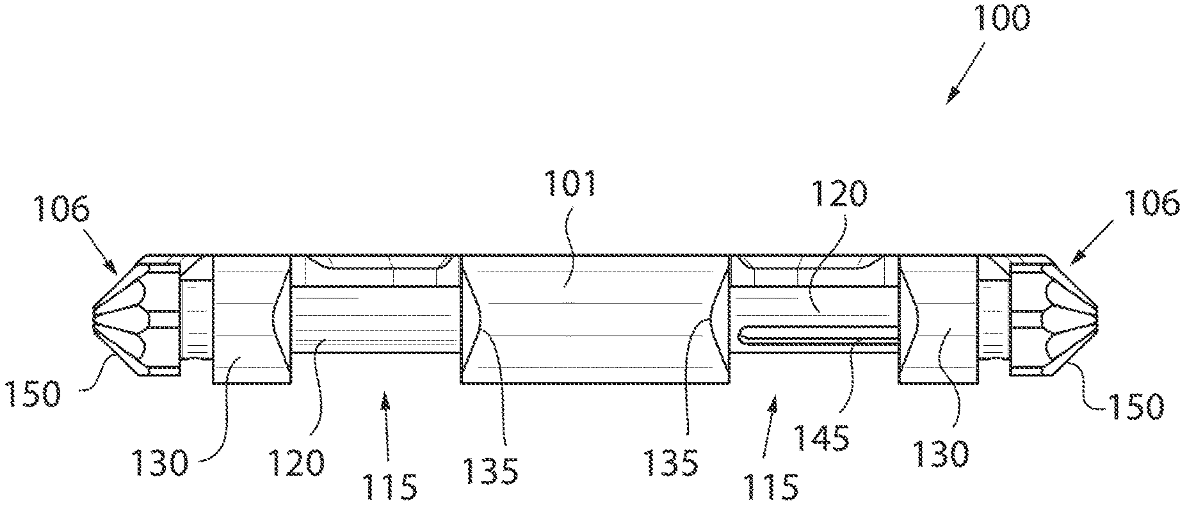
FIG. 4 is a projected bottom view of the rigging plate of FIG. 1.
Figure 5:
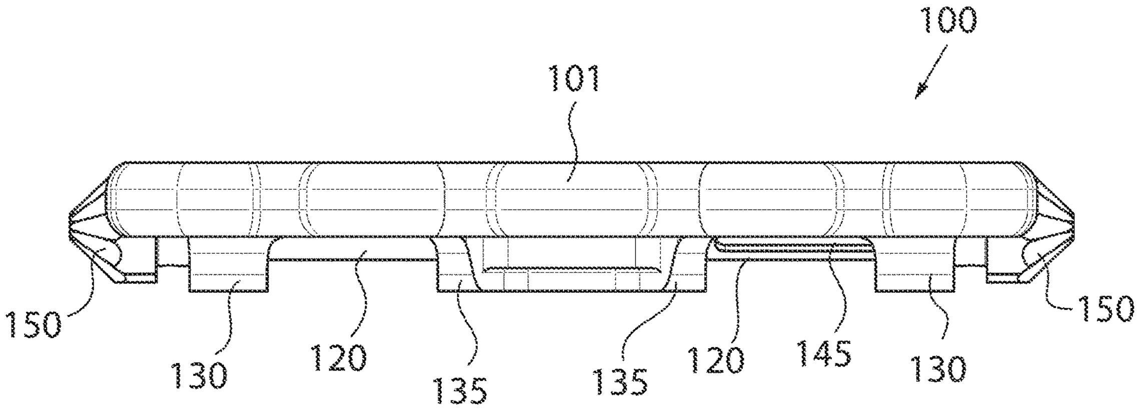
FIG. 5 is a projected top view of the rigging plate of FIG. 1.
Figure 6:
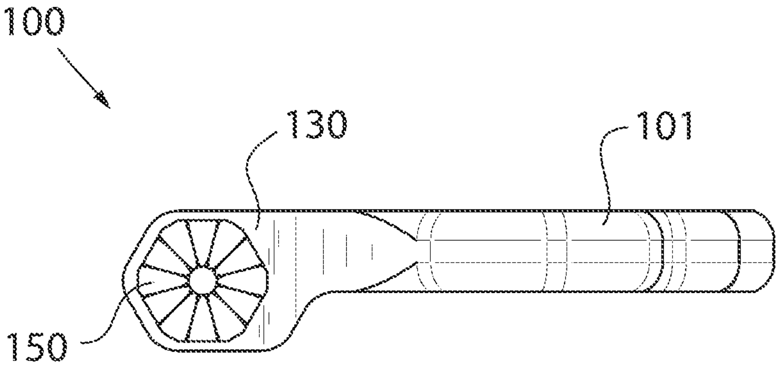
FIG. 6 is a projected right view of the rigging plate of FIG. 1.
Figure 7:
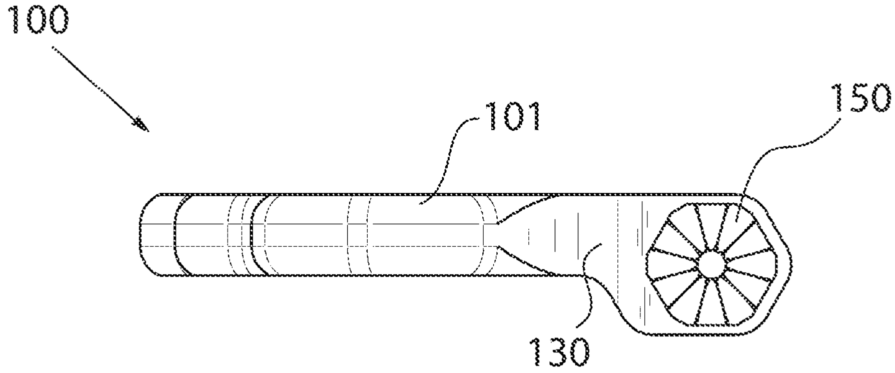
FIG. 7 is a projected left view of the rigging plate of FIG. 1.

The disclosed rigging plate with retracting pins may be usefully employed for a number of systems or assemblies to move or suspend equipment or people through the air or along inclined surfaces using rope, cable, wire, or similar component and associated lifting, winching, lowering devices, mechanical advantage systems or manual power. Many of these systems or assemblies are composed of disparate components that must be mechanically connected to each other using connectors such as shackles or carabiners. The disclosed rigging plate with retracting pins allows for some of these components to be connected in unique arrangements without the need for a separate connector and instead incorporating the function of the connector into the components themselves. This simplifies the systems, reduces total weight, and allows for more complex arrangements. The retracting pins may also be incorporated into other similar devices, e.g., across the legs of a yoke on a shackle block.

FIGS. 1-11 show one embodiment of the disclosed rigging plate 100. The body 101 of rigging plate is generally in the shape of a handheld fan, greater in both horizontal and vertical dimensions than in its depth. At the top of the body 101, at the crest of the fan shape, is series of linearly arranged holes 105, generally rounded in shape, with a primary axis off set from the vertically central axis of the rigging plate. The rigging plate body 101 could be formed from a number of materials including aluminum, steel, and titanium alloys, ceramics, plastics or resins, or any number of other sufficiently rigid and strong materials. In the central portion of the body 101, different cavities or depressions 110 may be formed in order to reduce the total material and weight of the rigging plate 100 with minimal effect on its structural integrity. These depressions 110 may take the form of various shapes depending on the particular physical characteristics desired. Different components and rigging may be fed through the linearly arranged holes 105 in different arrangements to achieve a desired system. Opposite of the linearly arranged holes 105 at what would be the base of the fan shape and body 101 of the rigging plate is a pair of load pin assemblies 115. Within each load pin assembly 115 is a load pin 120 positioned within a generally U-shaped yoke 125. This embodiment utilizes two mirrored load pin assemblies 115 configured so that the load pins 120 of each assembly 115 are aligned with each other and translate along the same axis. Each load pin 120 spans between two legs of a yoke 125 and is configured to capture and retain a system component 175 in the space between the yoke 125 and the pin 120.

Figure 8:
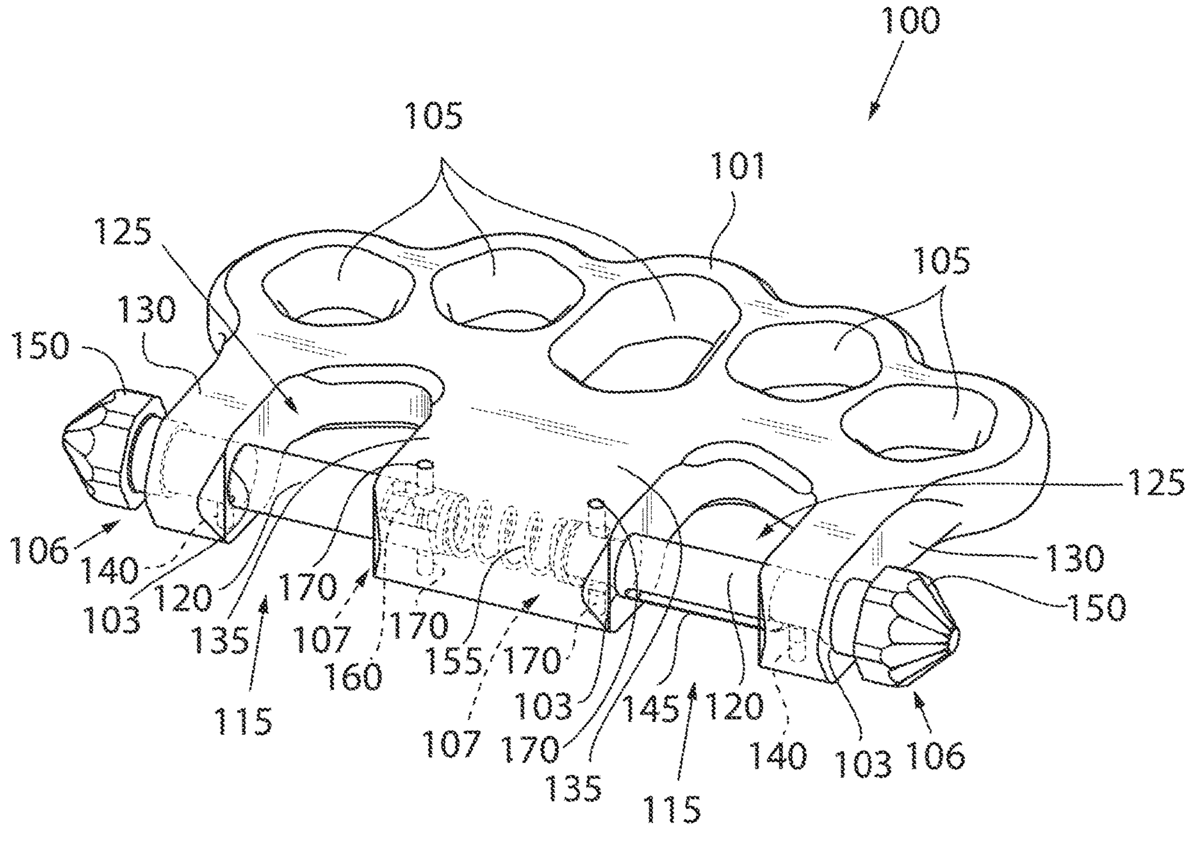
FIG. 8 is a perspective view of the rigging plate of FIG. 1, with hidden components shown in dashed lines.

The load pin assembly 115 is shown in more detail in FIG. 8. A load pin 120 is positioned along an axis passing through the track leg 130 and a lock leg 135 of a yoke 125 formed in the lower portion of the rigging plate body 101. The legs include circular openings 103 configured to allow the load pin 120 to pass through. Each load pin's freedom of motion is constrained by a track pin 140 secured within the track leg 130 of the yoke 125 and is journaled within a track slot 145 formed within the load pin 120. The track slot 145 is generally J-shaped, having three discrete sections, and prevents the load pin 120 from being removed from the yoke 125 during operation. Alternatively, the track pin 140 and track slot 145 may be omitted if desired for certain applications, an example of which is shown in embodiments depicted later. A pin cap 150 is secured to the outer end 106 of the load pin 120. In this particular embodiment, the pin cap 150 is oversized and faceted allowing for easier gripping and operation of the load pin 120 by a user, but other shapes and arrangements may be used for particular applications. A biasing member 155 is positioned within the lock leg 135 of the yoke 125 between the two load pins 120 and configured to respectively bias the two load pins 120 in an outward direction. In this embodiment, the biasing member 155 is shared between the two load pin assemblies 115 and is a compression spring but may take other forms, including other types of springs, materials with sufficiently elastic mechanical properties, arrangements of magnets, or other means to provide a similar outward bias.

Figure 9:
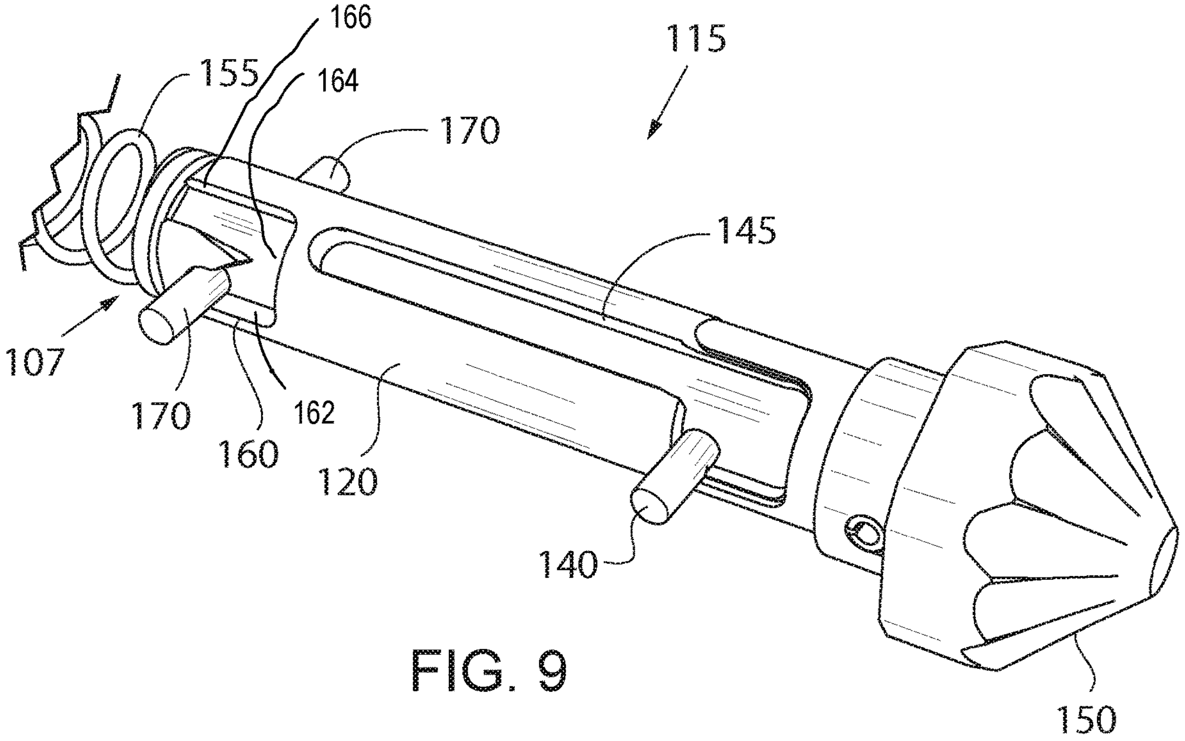
FIG. 9 is a perspective view of the load pin assembly of the rigging plate of FIG. 1.

The load pins 120 can be moved between a locked position and a retracted position. The load pins 120 require three or more discrete actions to retract, in an effort to make accidental opening less likely. The three or more discrete actions of the load pin 120 are determined by the shape and position of the lock slot 160 in which journals the lock pin 170. As shown in FIG. 9, lock slot 160 is generally J-shaped and as such requires the load pin 120 to be caused to make three distinct, sequential actions in order to be locked or retracted, corresponding to a first axial portion 162, a radial portion 164, and a second axial portion 166 of the lock slot 160. However, the disclosed rigging plate is not limited to a generally J-shaped lock slot and could be adapted to use other shapes, including a generally L-shaped slot with requiring only two sequential actions, or more complex shapes requiring a longer series of sequential actions to move the load pin 120 between locked and retracted positions in order to further reduce the chances of an accidental opening. The load pin assembly 115 may have multiple sets of lock slots 160 and lock pins 170 positioned radially along the load pin 120. In this embodiment, there is a set of two lock slots 160 and paired lock pins 170 positioned on opposite sides of the load pin 120, offset from each other by 180 degrees.

Figures 10A, 10B, 10C, 10D:
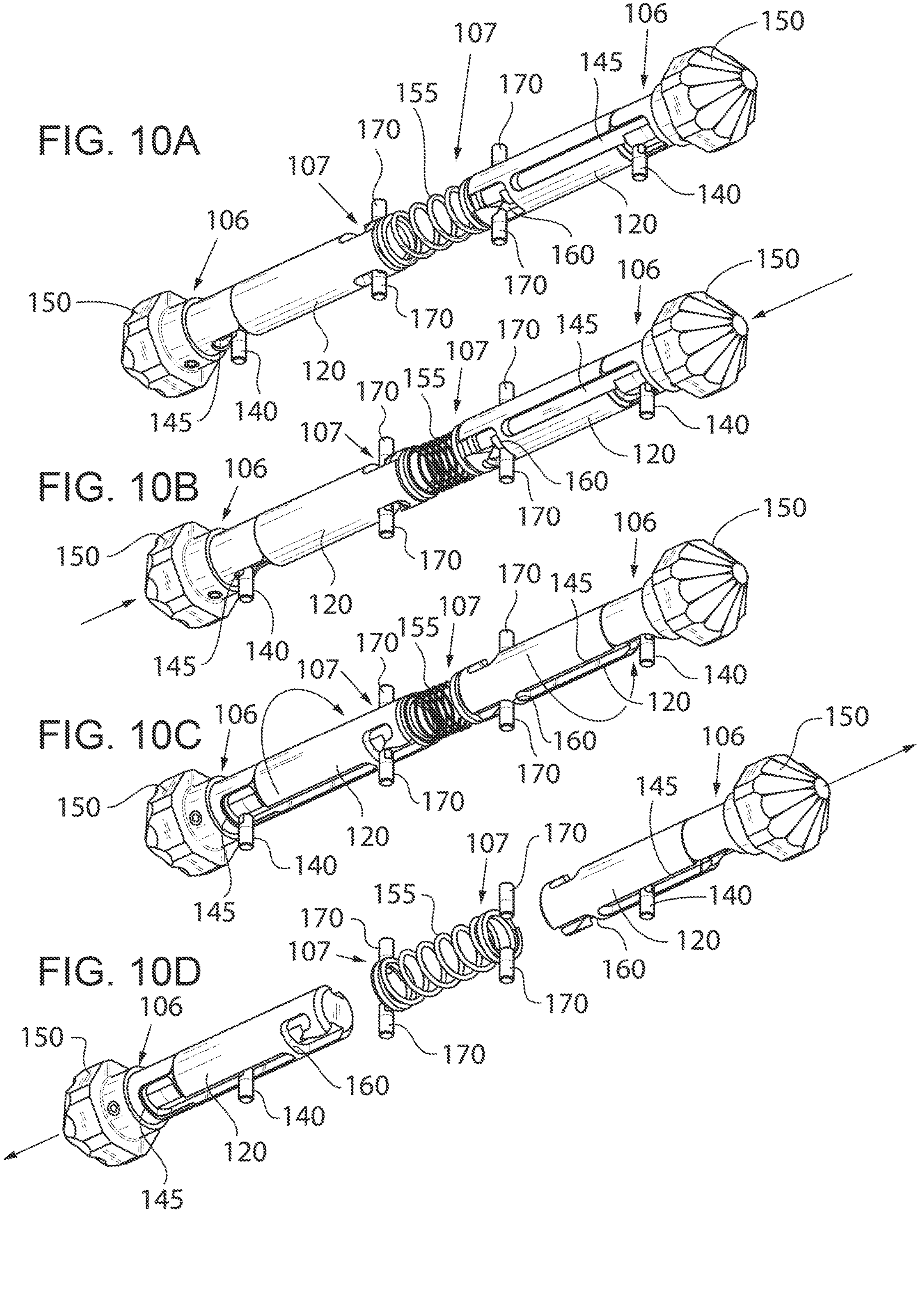
FIG. 10*a*-10*d* are perspective views of the load pins of the rigging plate of FIG. 1 moving from a locked position to a retracted position in four steps.

FIGS. 10*a*-10*d* shows the load pin assemblies 115 of the depicted embodiment in isolation moving between a locked position and a retracted position. FIG. 10*a* shows the two load pins 120 in a locked position and engaged with the biasing member 155. To move the load pins into a retracted position, first a linear force is applied to the load pins 120 as shown in FIG. 10*b*, acting against the force applied by the biasing member 155, causing each load pin 120 to move linearly inward toward the biasing member 155, and causing each lock pin 170 to journal through the first axial portion 162 of their corresponding lock slot 160 until they reach the radial portion 164. Second, the load pin 120 then must be caused to rotate about its axis, the lock pins 170 journaling through the radial portion 164 of their corresponding lock slot 160, as shown in FIG. 10*c*. Finally, as shown in FIG. 10*d*, the load pins 120 are caused to move outwardly away from the biasing member 155 to their retracted positions, the lock pins 170 journaling through the second axial portions 166 of the lock slot 160. The lock slots 160 are open at the end of the second axial portion 166, allowing the load pin 120 to separate from the lock leg 135 of the yoke 125 and provide clearance for the joining of a system component 175. In FIGS. 10*a*-10*d*, both load pins 120 are shown moving between their respective locked and retracted positions in unison, but each can be manipulated independently of each other with system components added or removed from one load pin without interfering with the integrity of the other.

Figure 11:
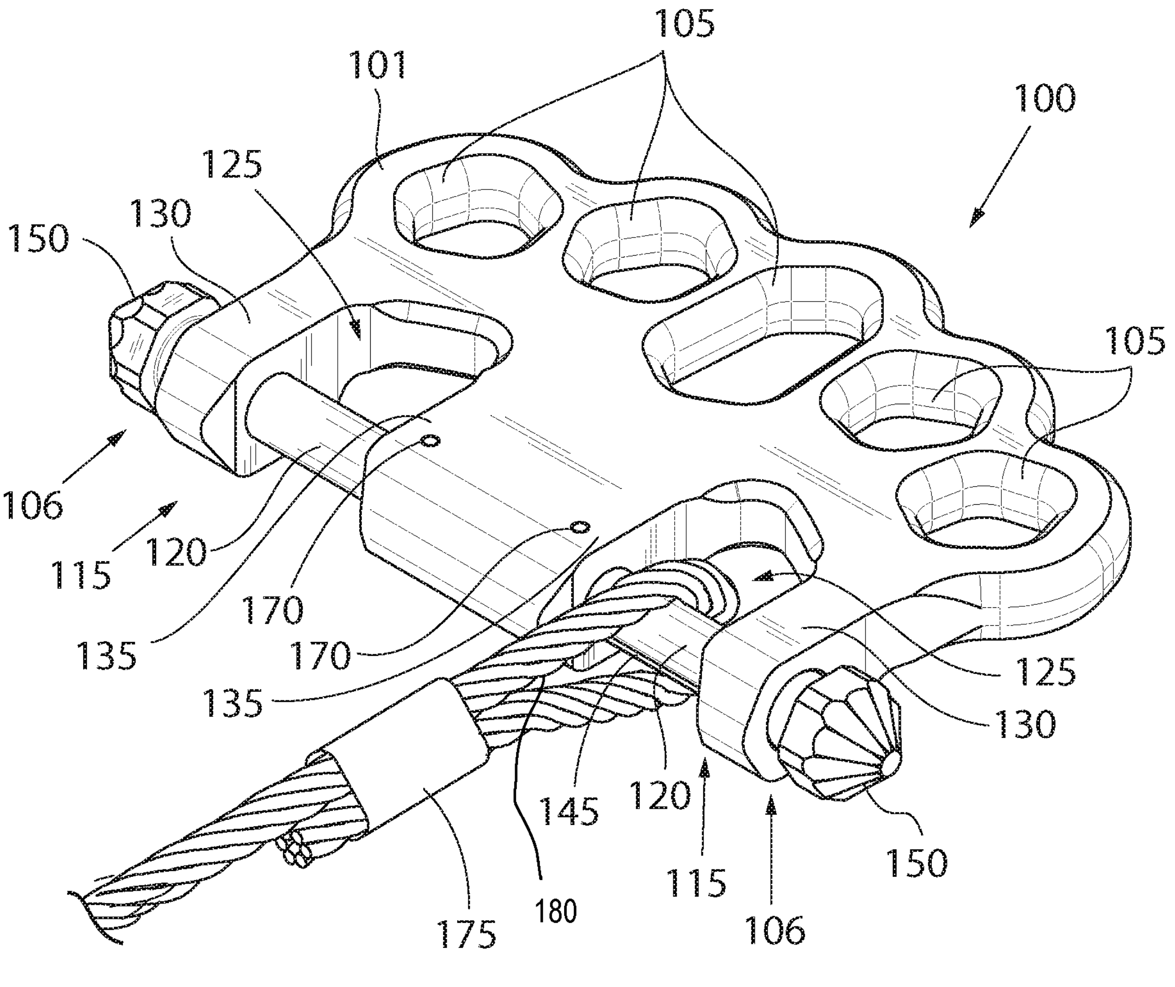
FIG. 11 is a perspective view of the rigging plate of FIG. 1 engaged with a system component.
Figure 12:
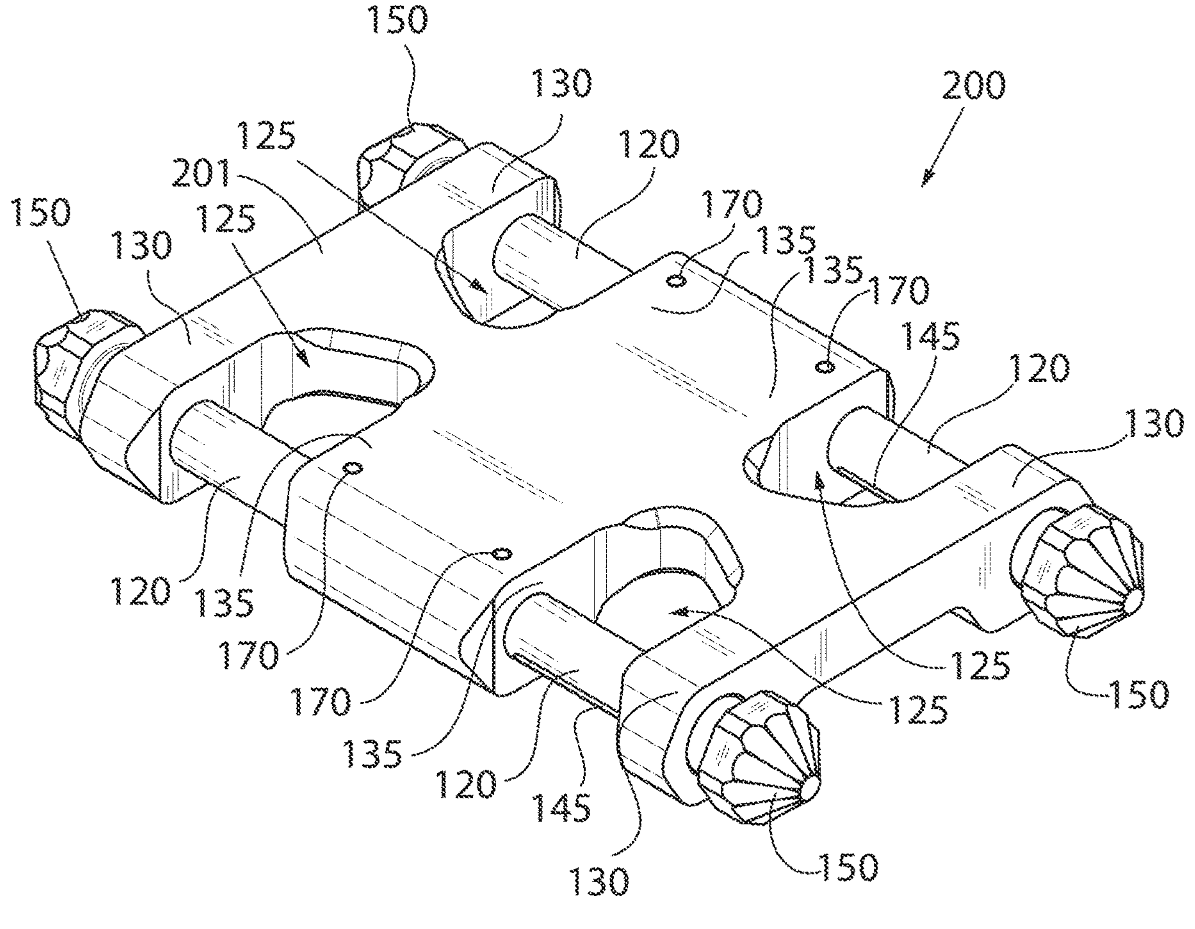
FIG. 12 is a perspective view of an alternative embodiment of a rigging plate with retracting pins.
Figure 13:
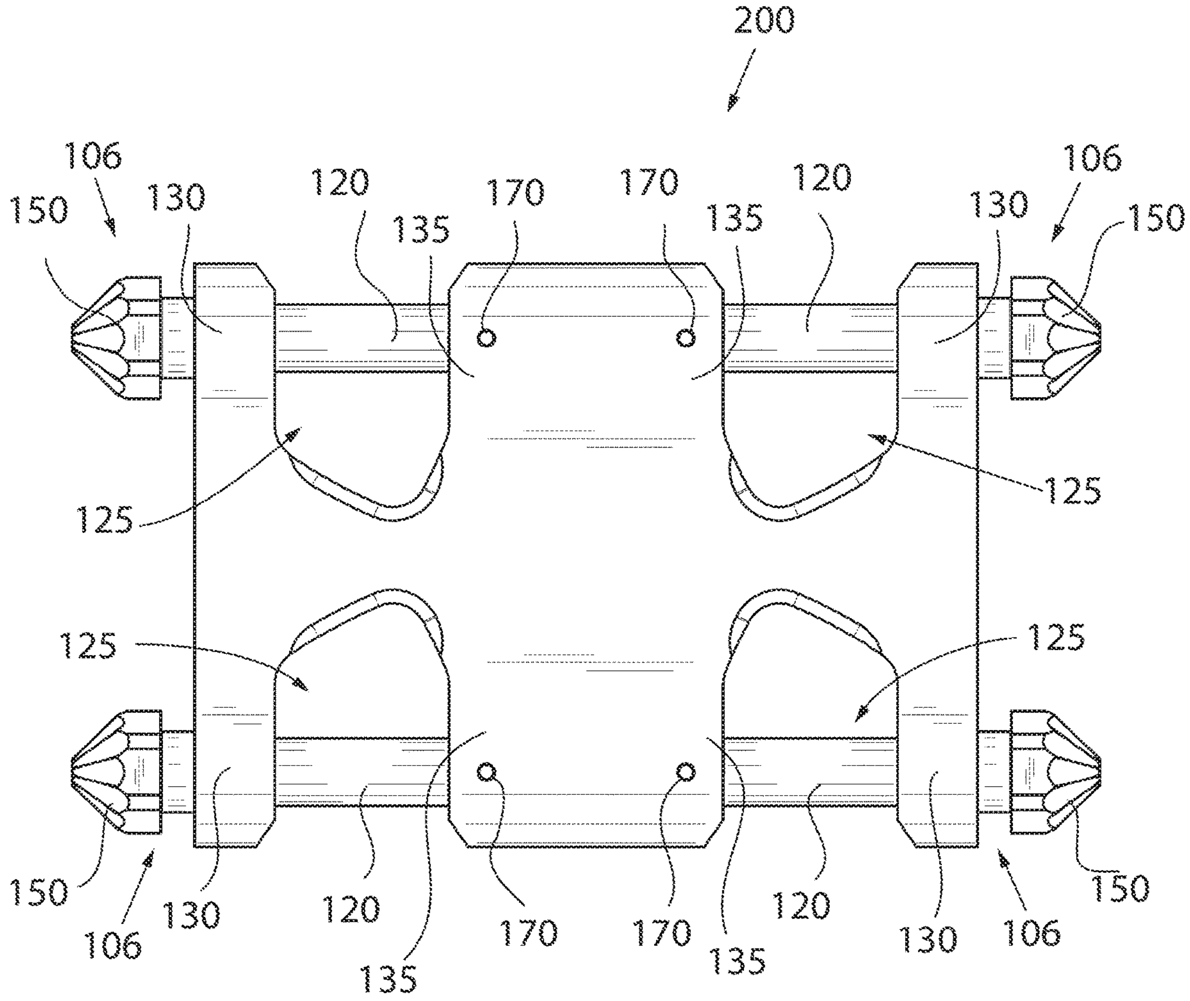
FIG. 13 is a projected front view of the rigging plate of FIG. 12.
Figure 14:
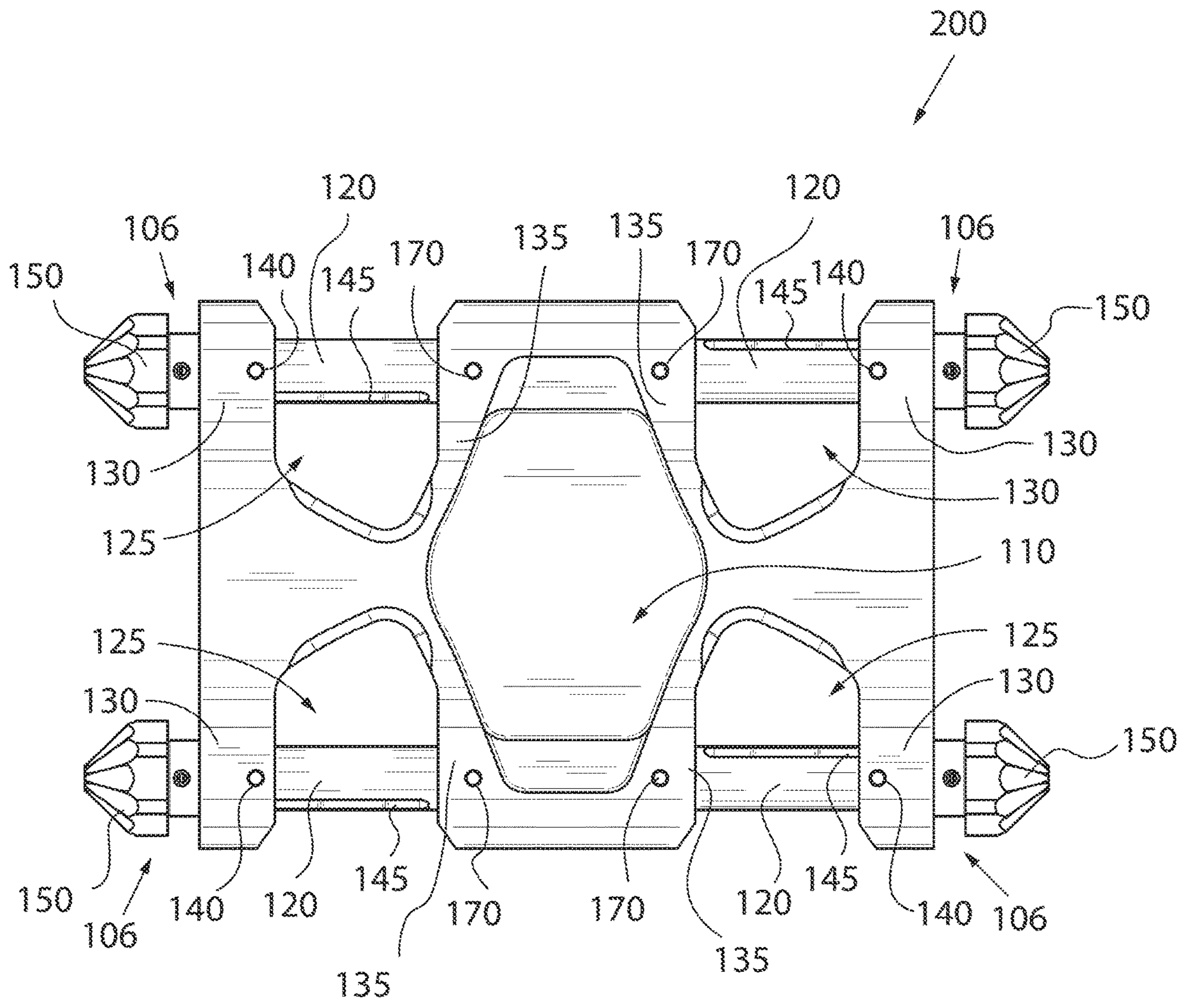
FIG. 14 is a projected rear view of the rigging plate of FIG. 12.
Figure 15:
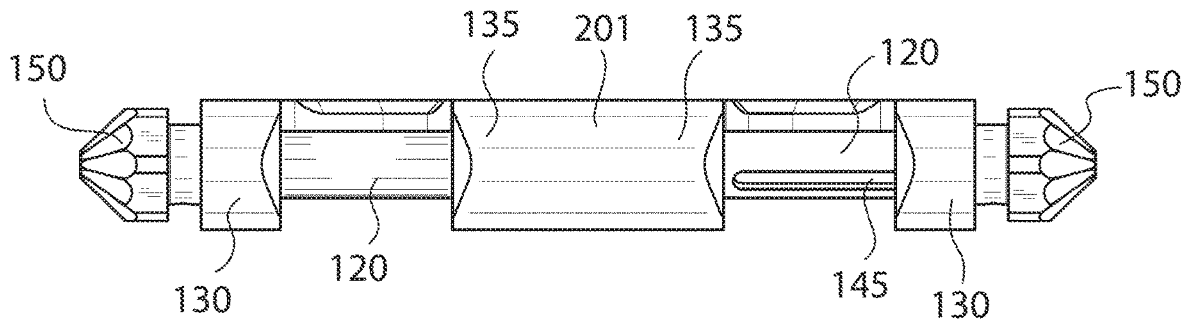
FIG. 15 is a projected bottom view of the rigging plate of FIG. 12.
Figure 16:
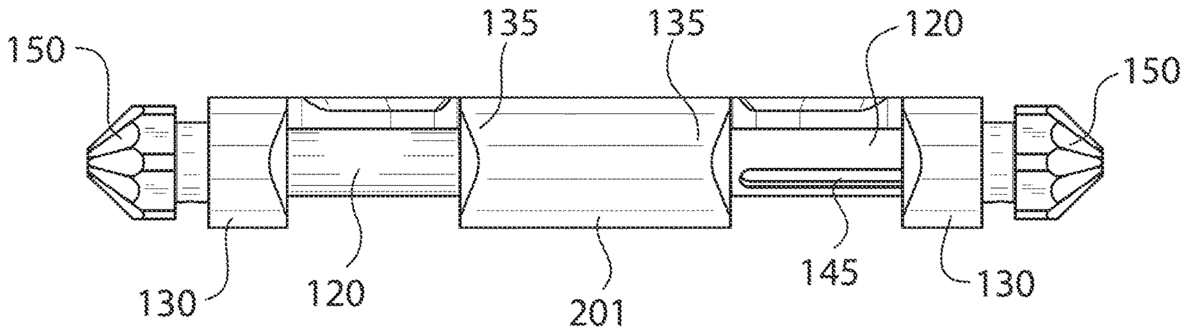
FIG. 16 is a projected top view of the rigging plate of FIG. 12.
Figure 17:
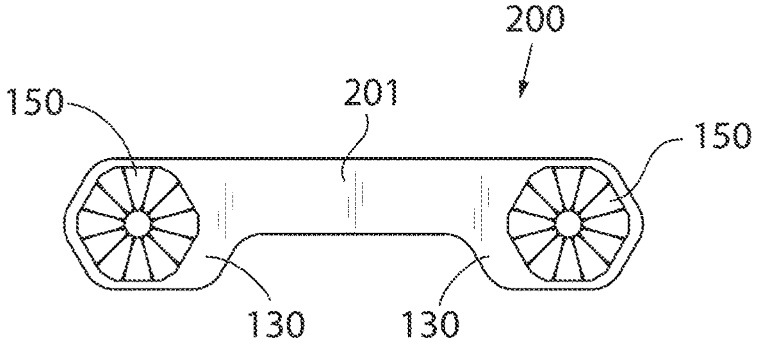
FIG. 17 is a projected right view of the rigging plate of FIG. 12.
Figure 18:
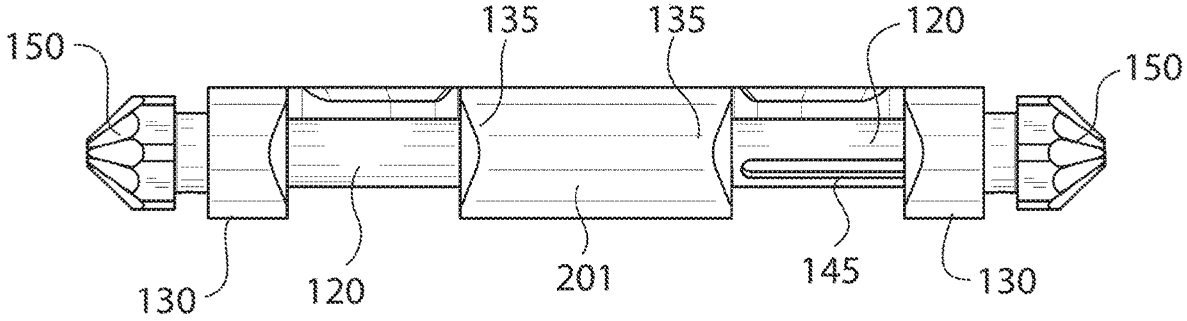
FIG. 18 is a projected left view of the rigging plate of FIG. 12.
Figure 19:
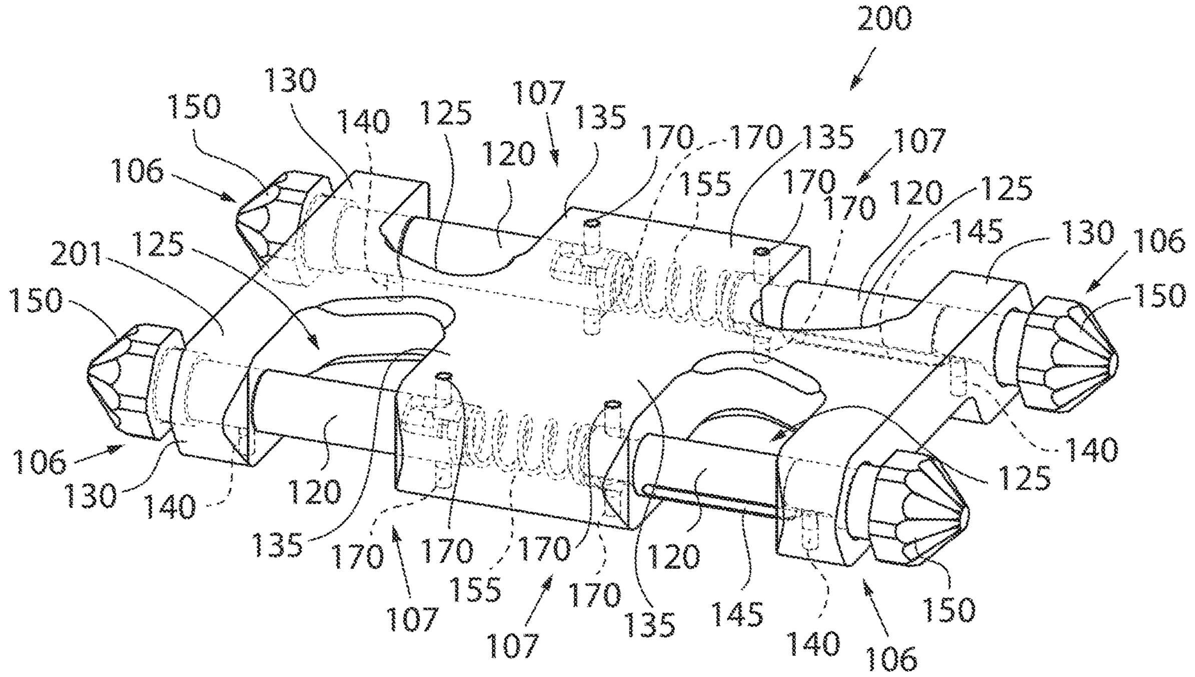
FIG. 19 is a perspective view of the rigging plate of FIG. 12, with hidden components shown in dashed lines.
Figure 20:
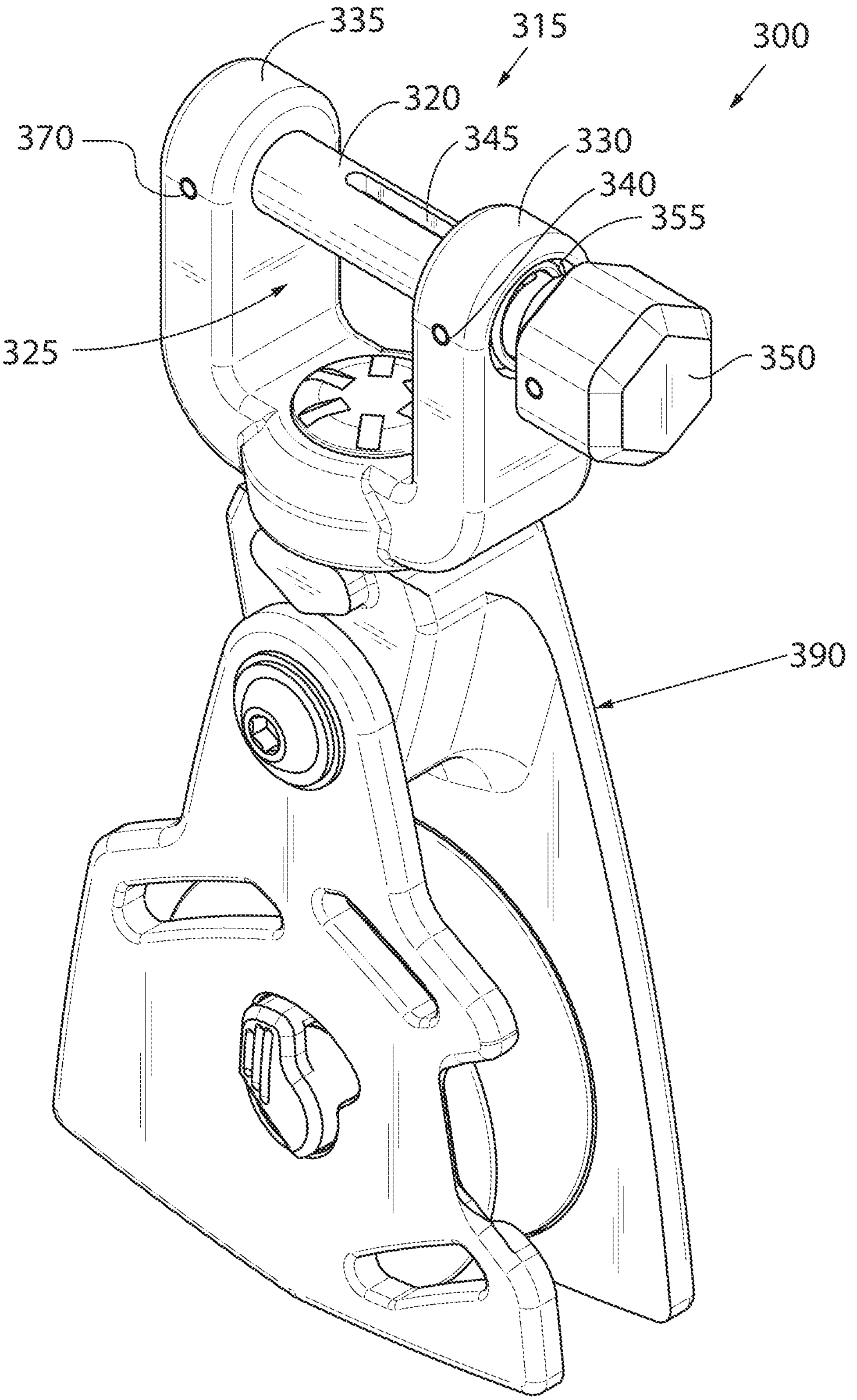
FIG. 20 is a perspective view of another alternative embodiment of a securement device with a retracting pin shown attached to a shackle block.
Figure 21:
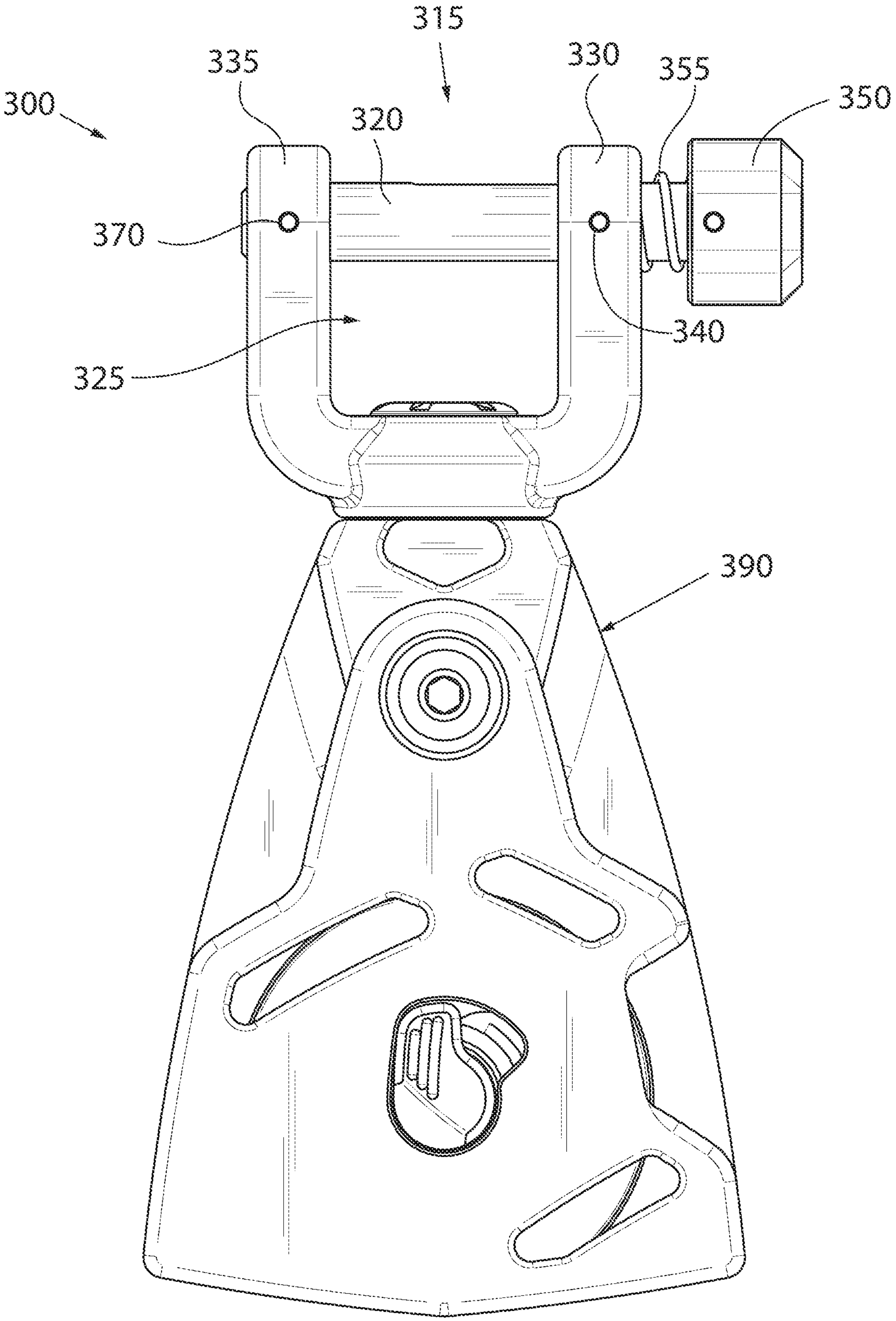
FIG. 21 is a projected front view of the rigging plate of FIG. 20.
Figure 22:
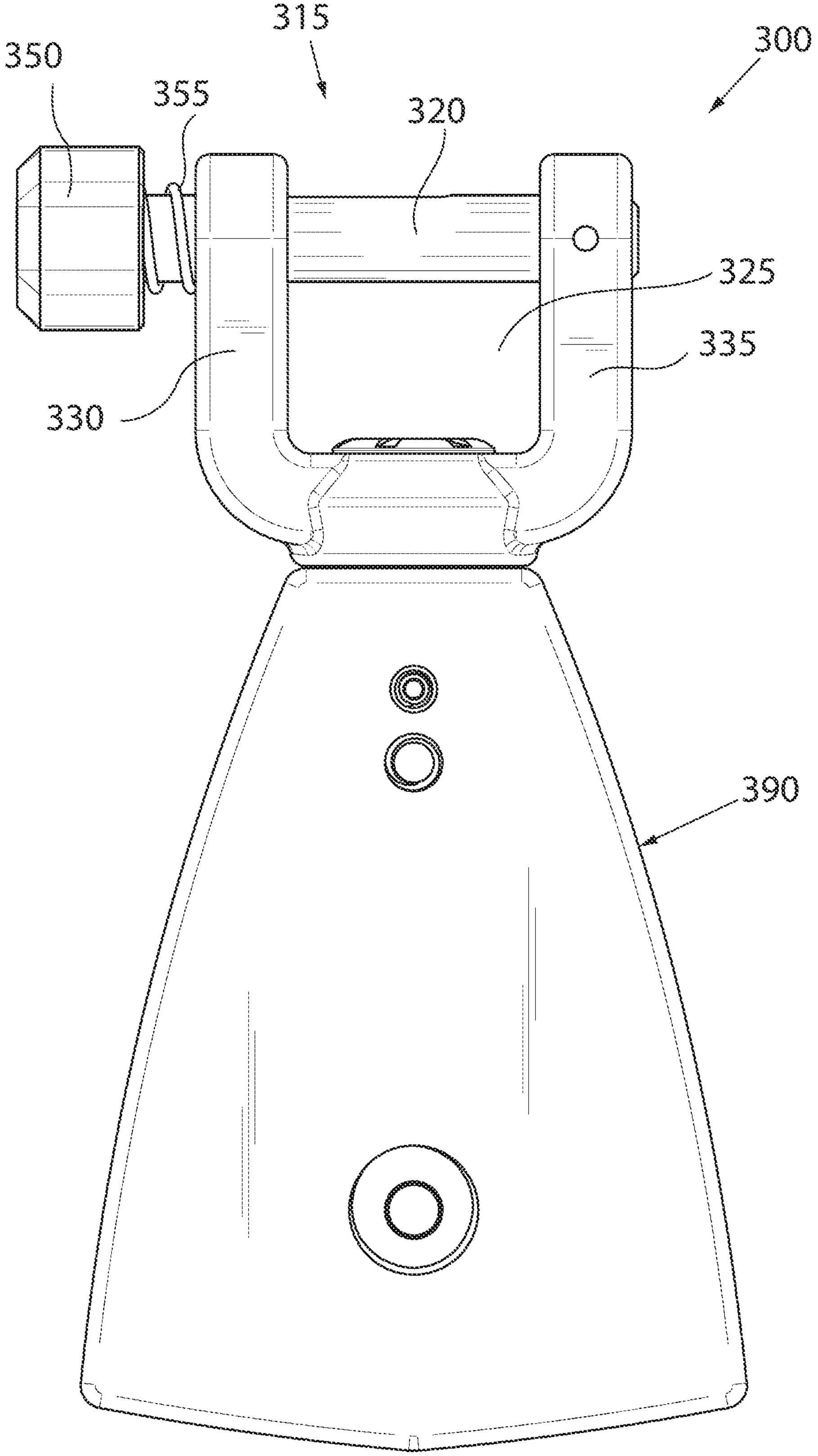
FIG. 22 is a projected rear view of the rigging plate of FIG. 20.
Figure 23:
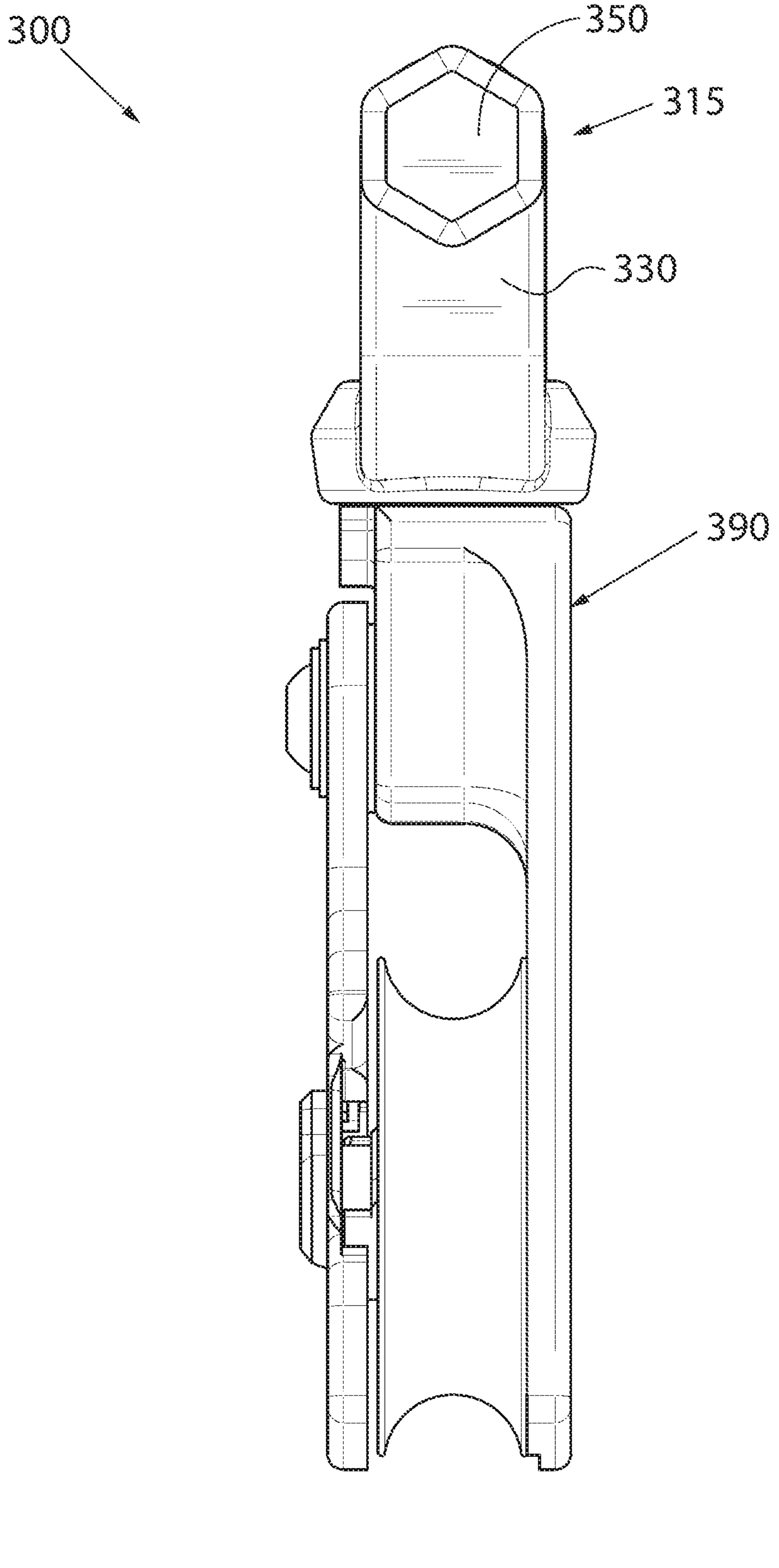
FIG. 23 is a projected right view of the rigging plate of FIG. 20.
Figure 24:
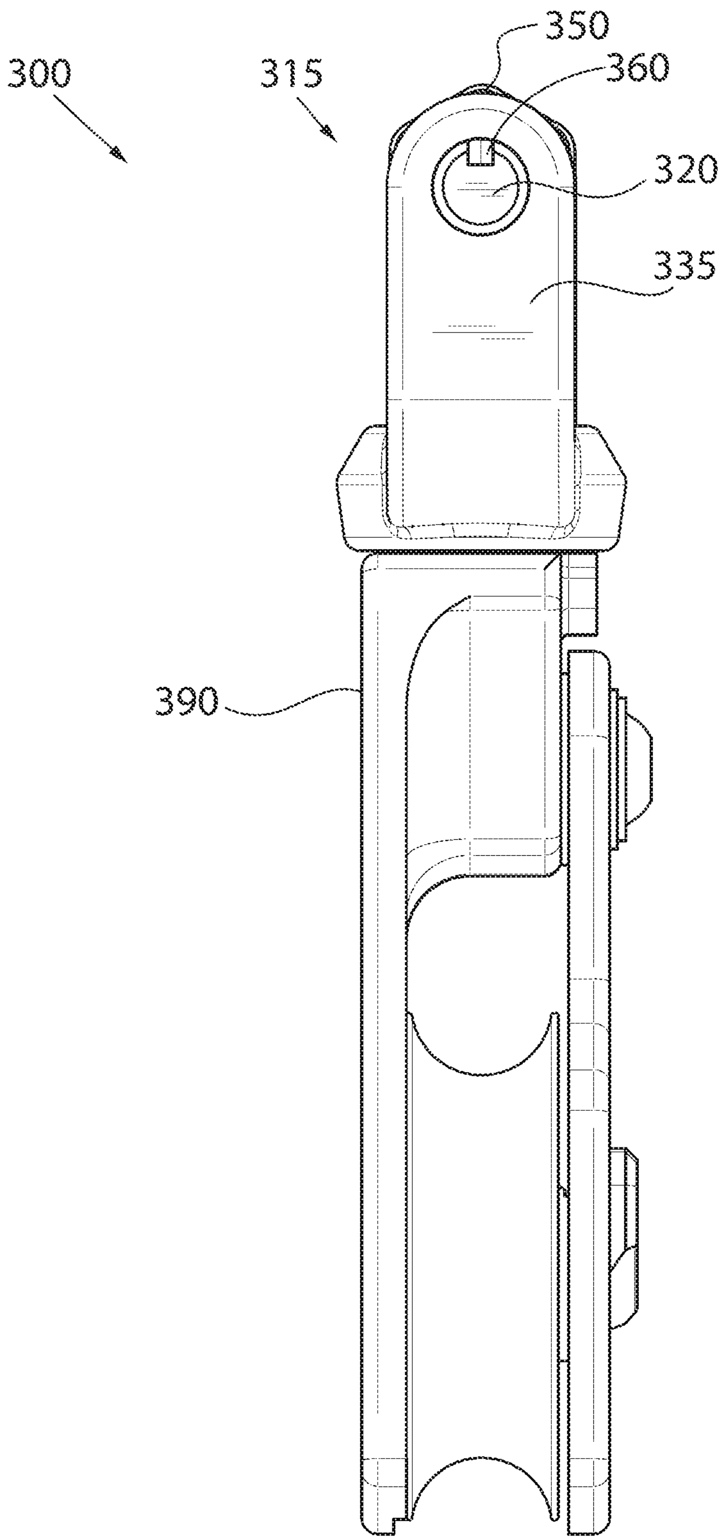
FIG. 24 is a projected left view of the rigging plate of FIG. 20.
Figure 25:
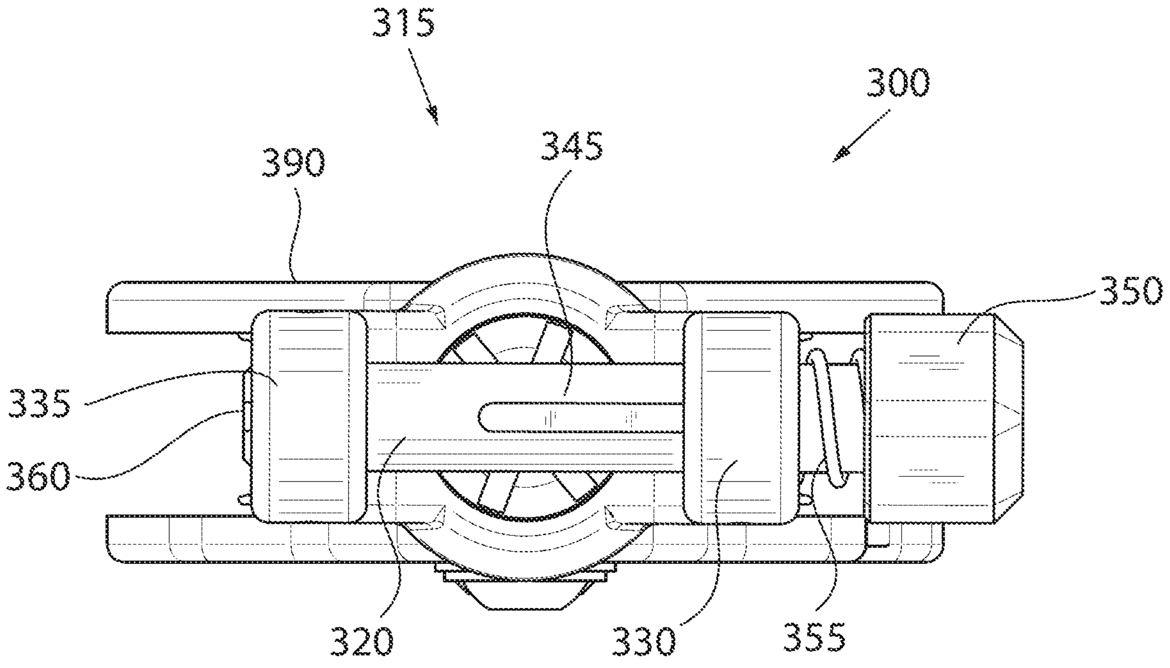
FIG. 25 is a projected top view of the rigging plate of FIG. 20.
Figure 26:
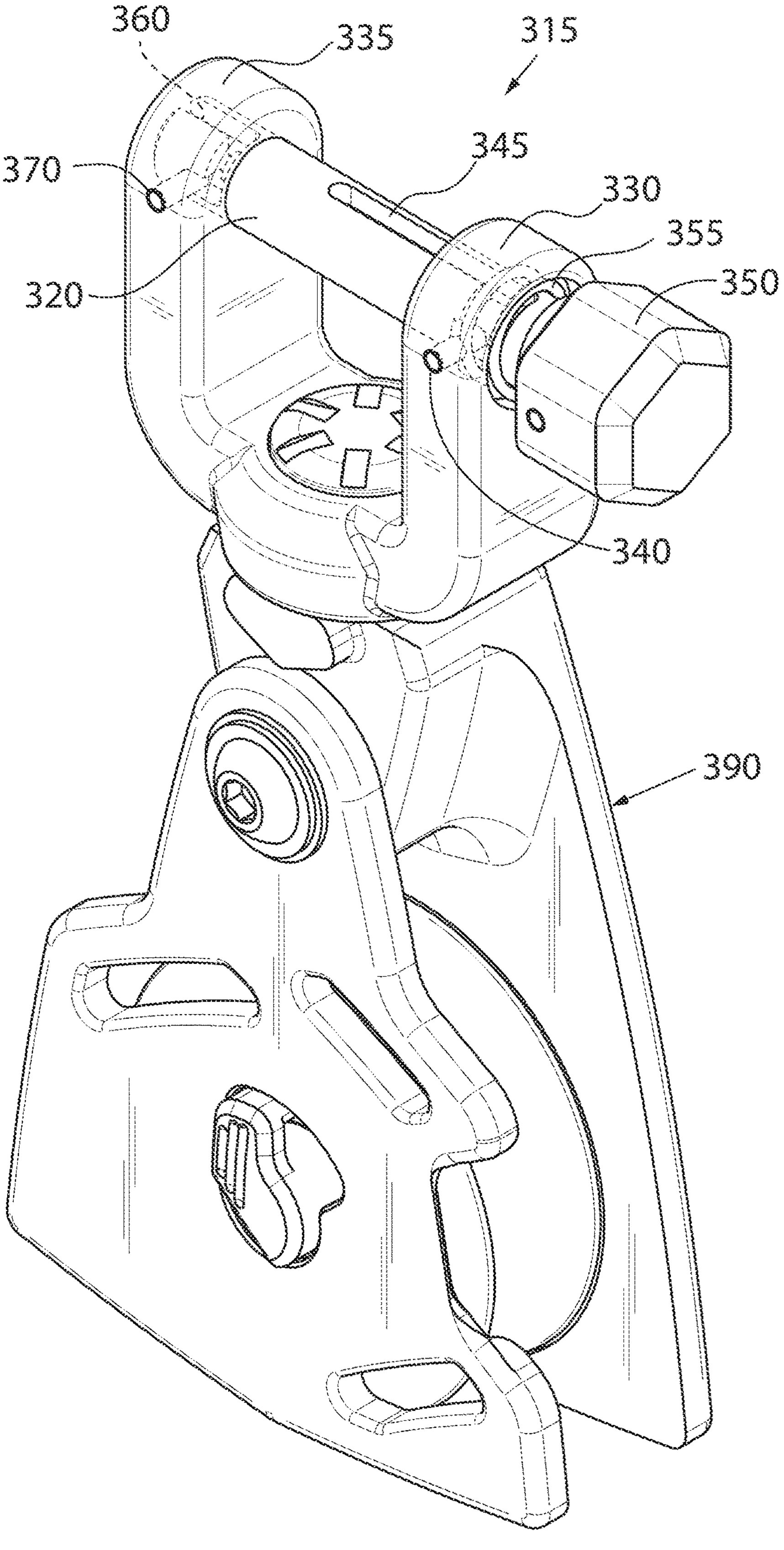
FIG. 26 is a perspective view of the rigging plate of FIG. 12, with hidden components shown in dashed lines.
Figure 27:
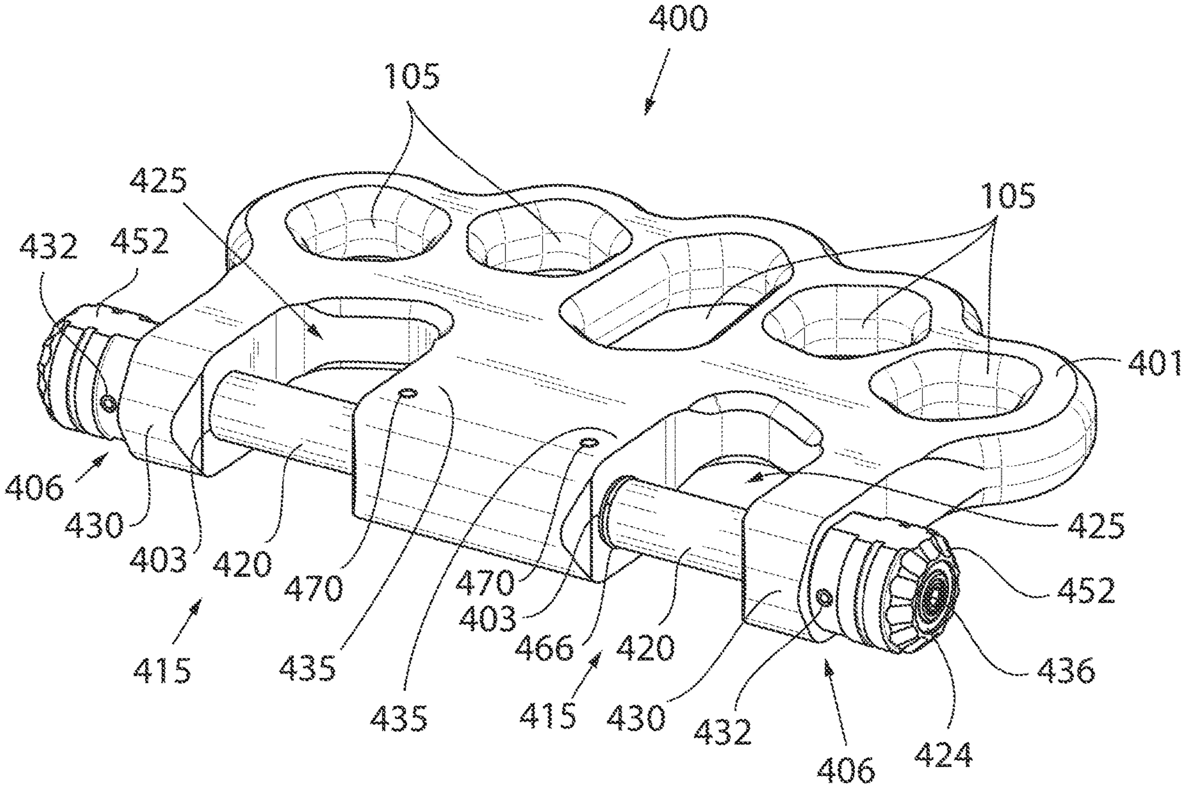
FIG. 27 is a perspective view of an exemplary embodiment of a rigging plate with retracting pins.
Figure 28:
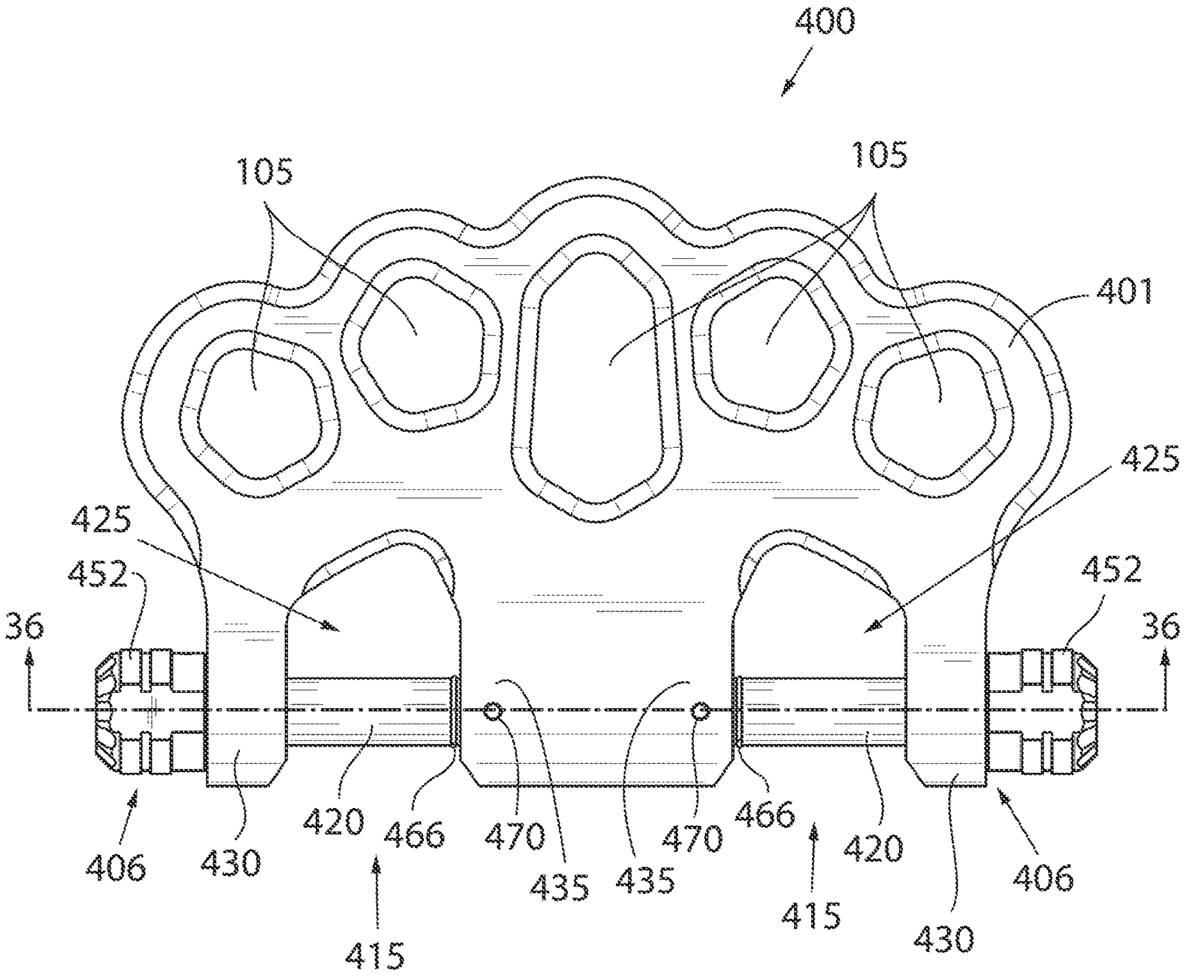
FIG. 28 is a projected front view of the rigging plate of FIG. 27.
Figure 29:
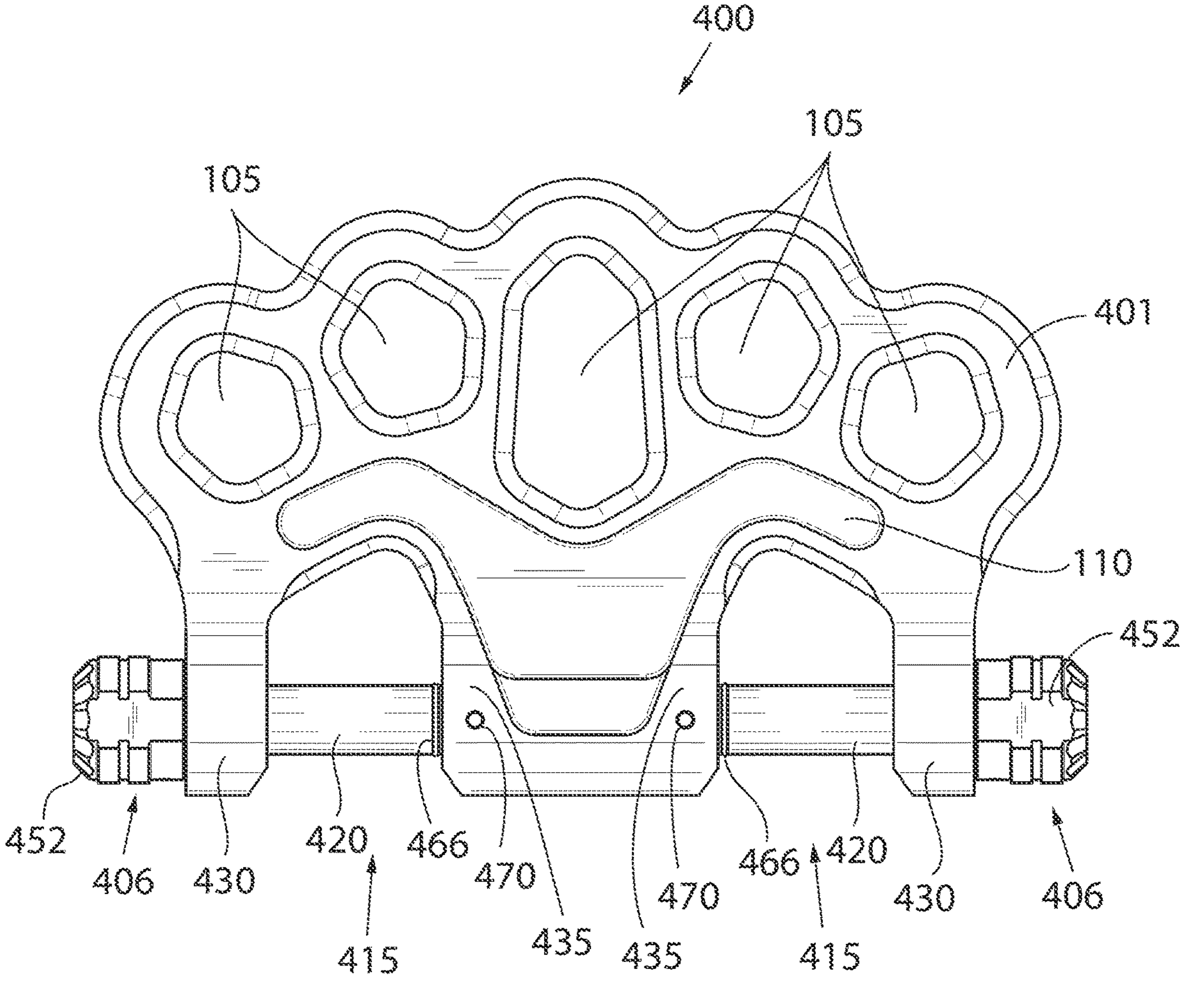
FIG. 29 is a projected rear view of the rigging plate of FIG. 27.
Figure 30:
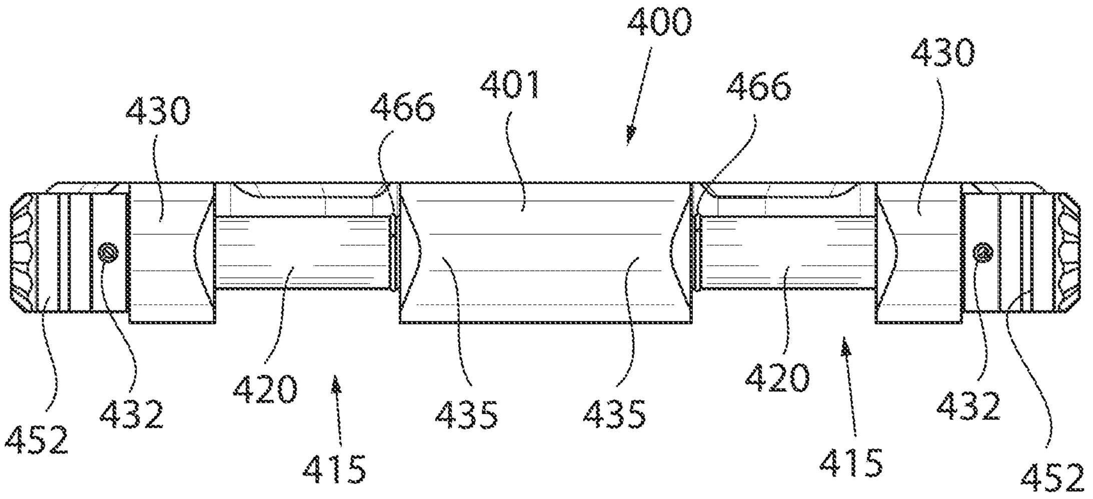
FIG. 30 is a projected bottom view of the rigging plate of FIG. 27.
Figure 31:
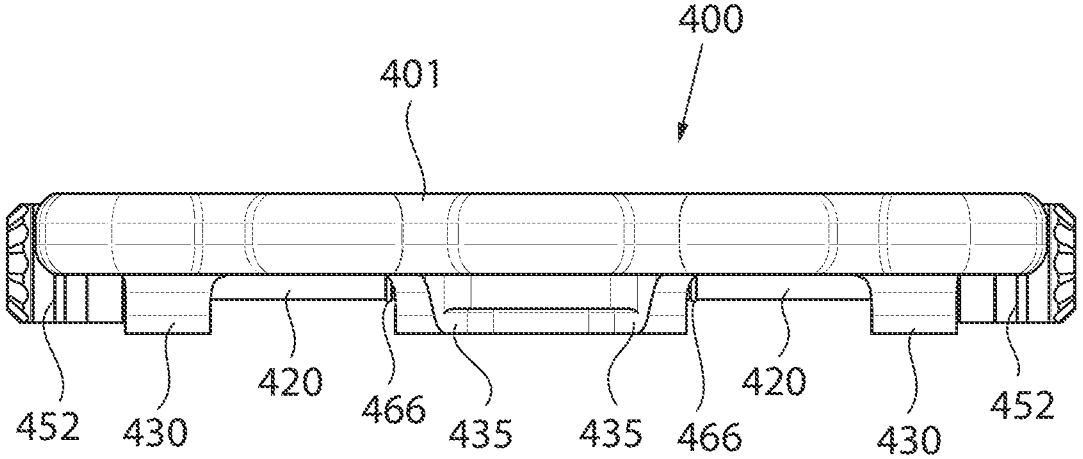
FIG. 31 is a projected top view of the rigging plate of FIG. 27.
Figure 32:
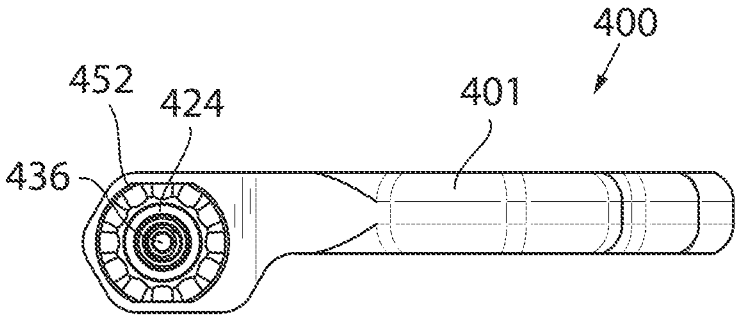
FIG. 32 is a projected right view of the rigging plate of FIG. 27.
Figure 33:
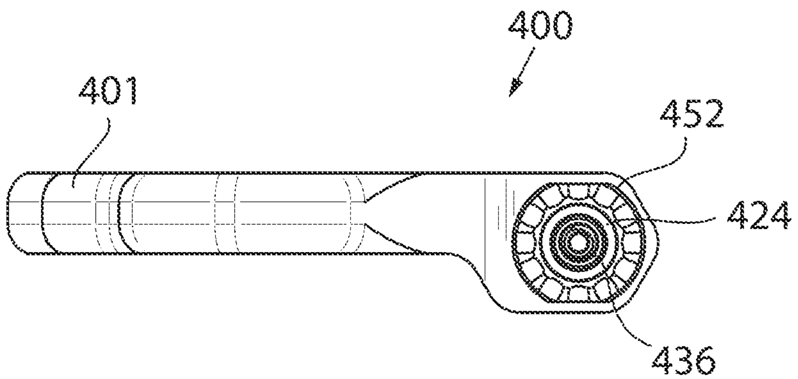
FIG. 33 is a projected left view of the rigging plate of FIG. 27.
Figure 34:
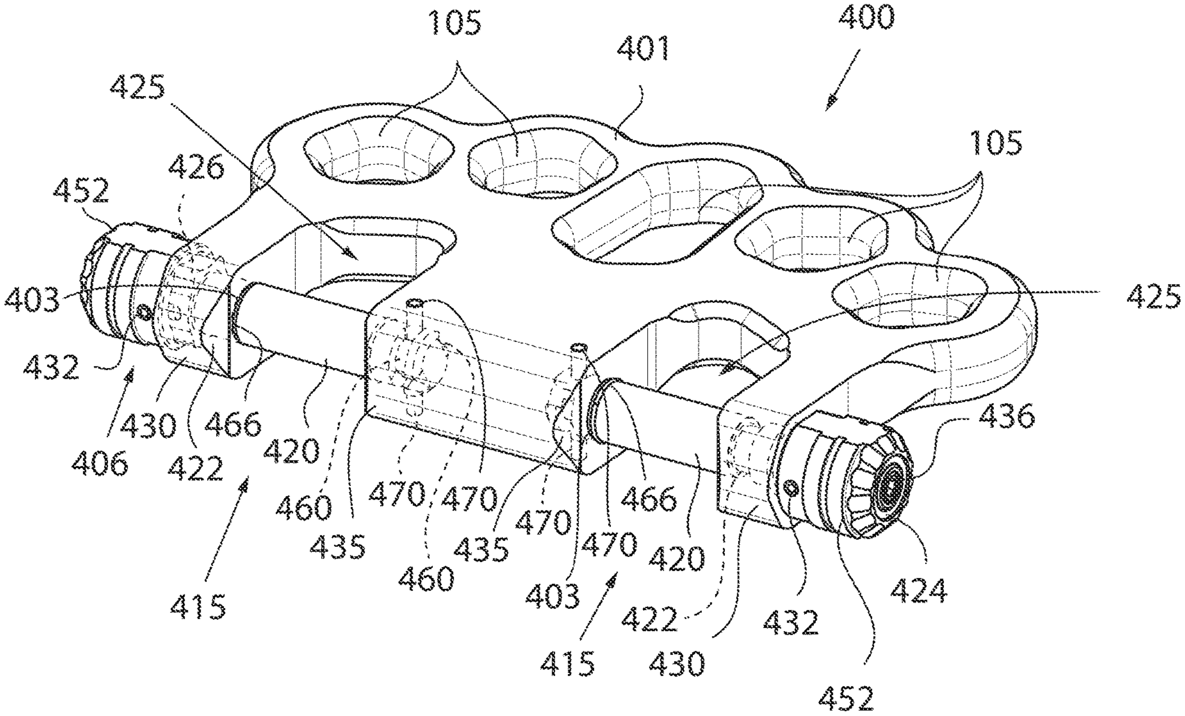
FIG. 34 is a perspective view of the rigging plate of FIG. 27, with hidden components shown in dashed lines.

In FIG. 11, a system component 175 is shown joined to the disclosed rigging plate 100. In order to join a system component 175 to the disclosed rigging plate 100, the load pin 120 must be in a retracted position, in which it is retained by the track pin 140 in the track leg 130 of the yoke 125 and there is a clearance between the inner end 107 of the load pin 120 and the lock leg 135 that will allow passage of the component 175. The component 175 has a connection hole 180 and is positioned in the yoke 125 with its connection hole 180 generally in line with the load pin 120 of the disclosed rigging plate 100. The load pin 120 is then translated axially until it passes through the connection hole 180 of the component 175 and engages with the lock leg 135 of the yoke. Following the reverse of the steps outlined in the previous paragraph, the lock pin 170 journals within the second axial portion 166 of the lock slot 160 and simultaneously engages the biasing member 155 until the lock pin 170 reaches the radial portion 164 of the lock slot 160. The load pin 120 must then be caused to rotate with the lock pin 170 journaling through the radial portion 164 of the lock slot 160 until the lock pin 170 reaches the first axial portion 162 of the lock slot 160. The load pin 120 may then be released and the force from the biasing member 155 ensures that the load pin 120 does not move unless caused to move by an outside force. The system component 175 will then be retained by the load pin 120 and yoke 125.

As discussed, in order to remove other system components 175 from the rigging plate 100, the load pin 120 must be translated a distance as determined by the first axial portion 162 of the lock slot 160, then rotated an angle as determined by the radial portion 164 of the lock slot 160, then translated axially a distance as determined by the second axial portion 166 of the track slot 145. The system component 175 may then be removed from the yoke 125.

An alternative embodiment of the disclosed rigging plate 200 in shown in FIGS. 12-19. In this embodiment, the series of linear holes along the top of the rigging plate body 201 has been replaced by a second set of two load pin assemblies 215. These additional load pin assemblies 215 function as previously described. Another alternative embodiment of the disclosed rigging plate 300 is shown in FIGS. 20-26, depicting the incorporation of the load pin assembly 315 into a shackle block 390. This embodiment's load pin assembly 315 incorporates only a single load pin 320 positioned within a single yoke 325 with a track leg 330 and lock leg 335, wherein the load pin 320 is secured using only a single lock pin 370 and lock slot 360, but retains a similar single track pin 340 and track slot 345 design. The biasing member 355 is also moved from within the lock leg 335 of the yoke 325 to along the load pin 320 between the track leg 330 of the yoke 325 and the pin cap 350.

In FIGS. 27-39, another alternative embodiment of the rigging plate 400 is shown. Similar to the previous embodiments, load pin assemblies 415 are positioned at the bottom of the rigging plate body 401, with a load pin 420 positioned along an axis passing through a track leg 430 and a lock leg 435 of a yoke 425 formed in the lower portion of the rigging plate body 401. The legs include circular openings 403 configured to allow the load pin 420 to pass through. The load pin 420 has an outer end 406 and an inner end 407, corresponding to the track leg 430 and lock leg 435 of the yoke 425. Positioned at the inner end 407 are lock slots 460 formed in load pin 420, generally in the shape of an "L" with an axial portion 462 and radial portion 464 and open at a point closest to the inner end 407 of the load pin 420. The two slots 460 are rotationally symmetrical, offset by 180 degrees to each other. Within each lock slot 460 is journaled a lock pin 470, which are similarly arranged and offset by 180 degrees to each other. The lock pins 470 are secured to the body 401 of the rigging plate 400. The lock pins 470 are configured to restrain the path of the load pin 420 when journaled within their corresponding lock slot 460.

Figure 35:
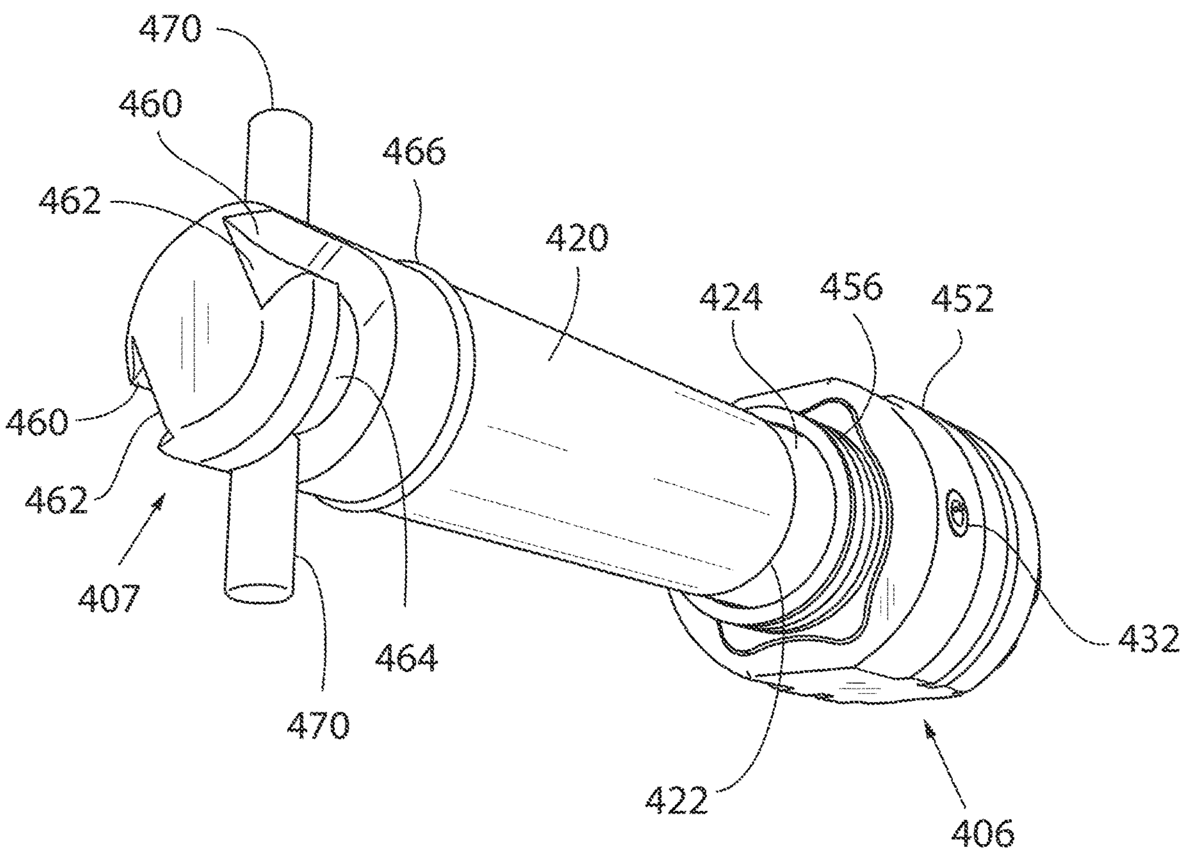
FIG. 35 is a perspective view of the load pin assembly of the rigging plate of FIG. 27.
Figure 36:
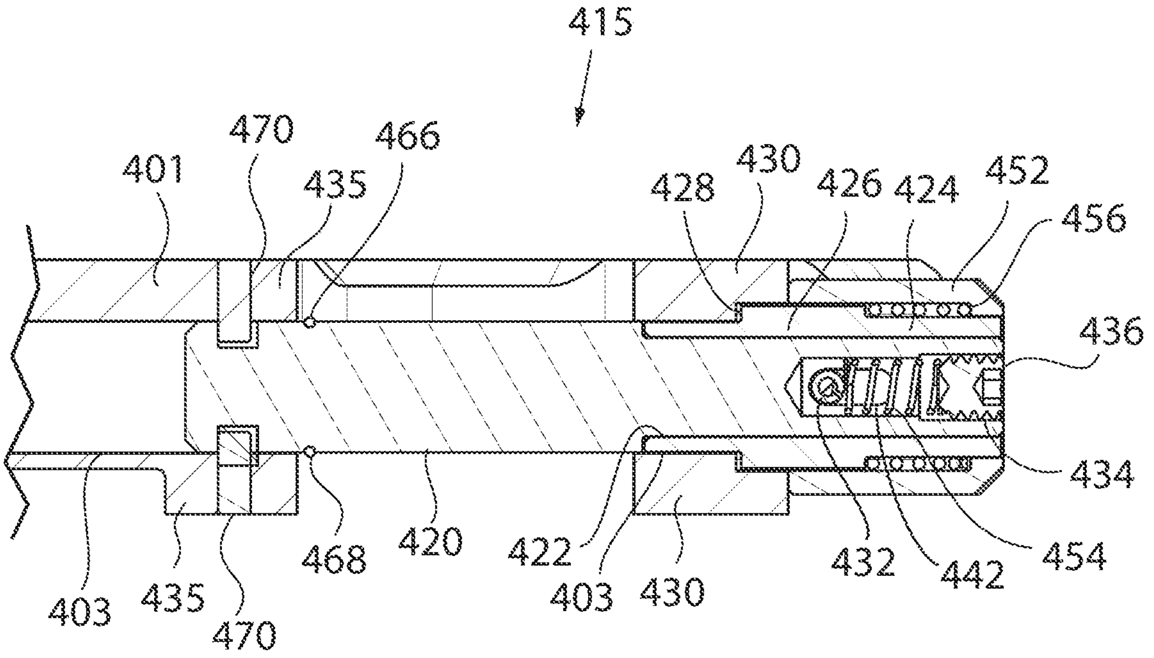
FIG. 36 is a cross sectional view taken along line 36-36 in FIG. 28.
Figure 37:
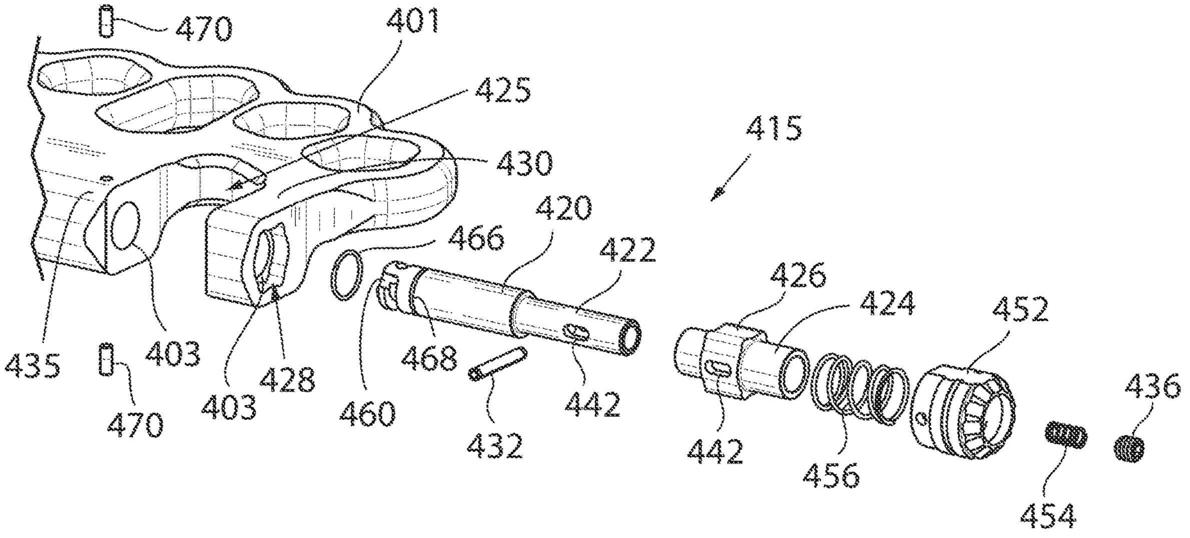
FIG. 37 is an exploded view of one of the load pin assemblies of FIG. 27.

As shown in greater detail in FIGS. 35-37, at the opposite end of the load pin 420 is its outer end 406. The outer end 406 includes a shoulder section 422 of lower radius. Positioned along this section is a lock ring 424 generally tubular in cross section and bisected by a keyed portion 426 of greater diameter and non-circular cross section. The non-circular portion 426 is keyed to fit within a recess 428 of the same shape formed in the body 401 of the rigging plate 400 on the outer side of the track leg 430 and is designed to prevent rotation of the lock ring 424 relative to the rigging plate body 401. In this embodiment, the section is similar to a star shape with rounded corners but can take on any number of different shapes that would prevent rotation of the lock ring 424 about the same axis when keyed to a corresponding recess 428. A sleeve 452 is secured to the outer end 406 of the load pin 420, fitting over the load pin 420 and lock ring 424. In this embodiment, the sleeve 452 is faceted and knurled to aid a user in gripping and manipulating the load pin 420. A set of pin slots 442 are formed axially within the shoulder 422 of the load pin 420 and the lock ring 424, configured to allow a spring pin 432 to pass through each side of the load pin 420 and the lock ring 424. The spring pin is secured to the sleeve 452.

A hole 434 is formed axially beginning from the outer end 406 of the load pin 420 for a partial distance of the shoulder 422 and intersects perpendicularly with the pin slots 442 formed in the load pin 420. The hole 434 is at least partially threaded, and a set screw 436 is used to secure an inner biasing member 454 between the set screw 436 and the spring pin 432. A second outer biasing member 456 is positioned along the outer section of the lock ring 424, between the keyed portion 426 of the lock ring 424 and an inner face of the sleeve 452. The inner biasing member 454 bias the sleeve 452 against the body of the rigging plate 400, while the outer biasing member 456 functions to bias the keyed portion 426 of the lock ring 424 into the recess 428. In this embodiment, both biasing members are compression springs, but they could take other forms, such as other types of springs, a sufficiently elastic material, or even an arrangement of magnets to provide a similar biasing force.

Figure 38A:
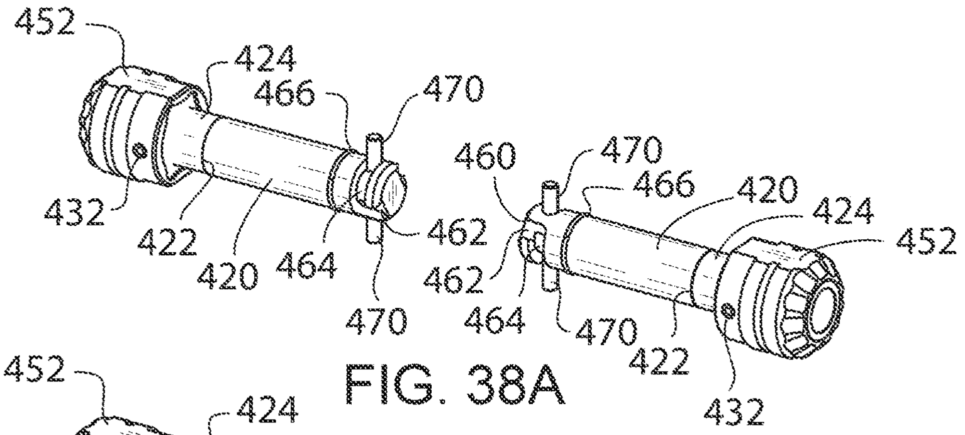
FIG. 38*a*-38*d* is a perspective view of the load pins of the rigging plate of FIG. 27 moving from a locked position to a retracted position in four steps.
Figure 38B:
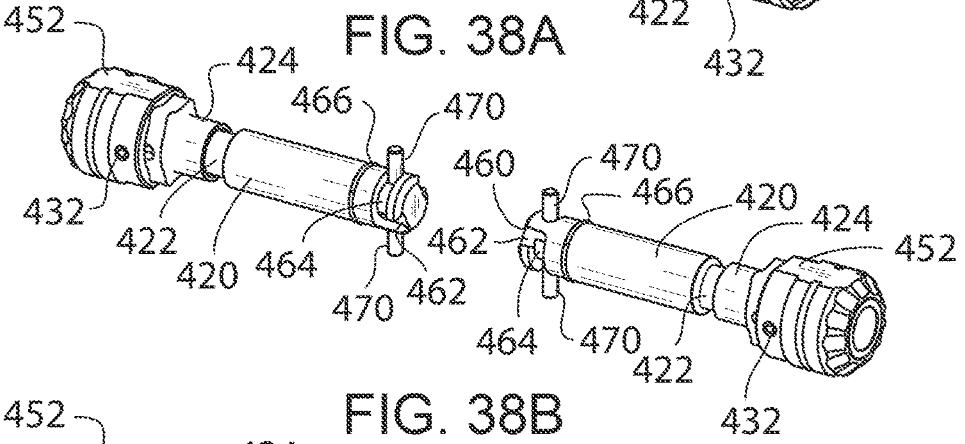
Figure 38C:
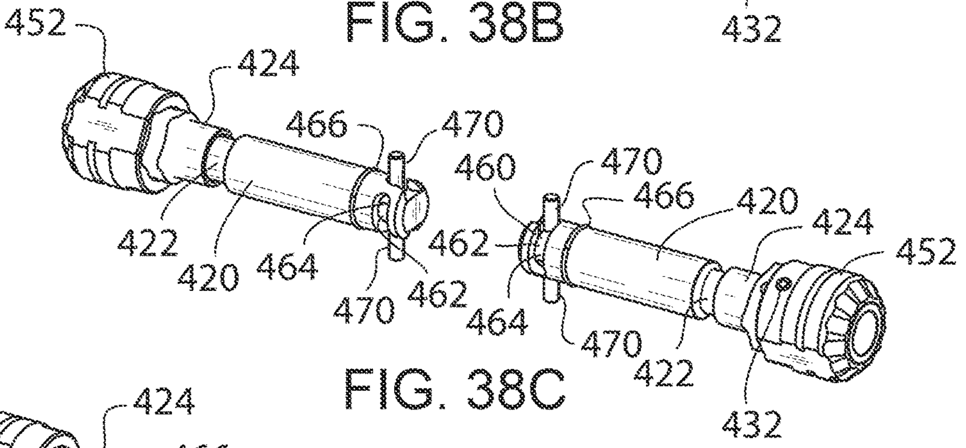
Figure 38D:
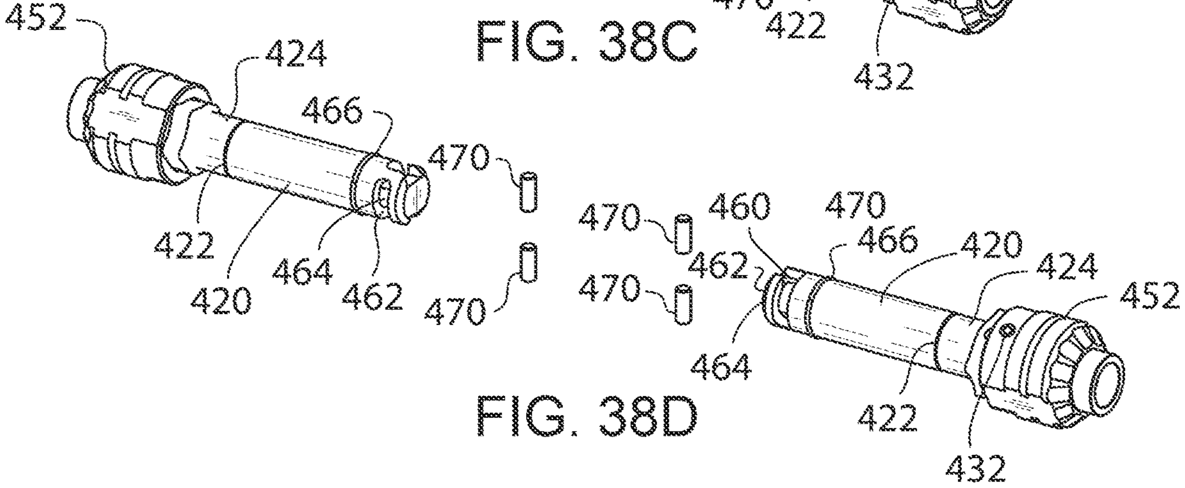

Similar to the previous embodiment, the load pins 420 can be moved between a locked and a retracted position, as shown in FIGS. 38*a*-38. FIG. 38*a* shows the load pin 420 in a locked position with the load pin 420 fully inserted in the lock leg 435 of the yoke, and the lock ring 424 fully inserted in the recess 428. From this position, the sleeve 452 is translated axially away from the rigging plate body 401, causing the spring pin 432 to journal through the pin slots 442, compressing the inner biasing member 454, until it reaches the end of the pin slot 442. At this point, further translation of the sleeve 452 will cause the lock ring 424 to translate in the same direction and cause the keyed portion 426 to be removed from the recess 428 in the track leg 430. As shown in FIG. 38*b*, the sleeve 452, lock ring 424, and load pin 420 can then be rotated relative to the body 401 of the rigging plate 400. This causes the two lock pins 470 to journal through the radial portion of the 464 of the lock slots 460. As shown in FIG. 38*c*, after about 120 degrees of rotation, the lock pins 470 reach the axial portion 462 of the lock slot 460. During this rotation, and anytime the load pin 420 is not fully in its locked position, the inner biasing member 454 causes the lock ring 424 to extend past the sleeve 452. This is a safety feature of the rigging plate 400 and is designed to alert the user when the load pin 420 is not fully in its locked position. Now the sleeve 452, lock ring 424, and load pin 420 are able to be further translated axially, causing the lock pins 470 to journal through the axial portion 462 of the lock slots 460, and the load pin 420 to separate from the lock leg 435 of the yoke 425. The load pin 420 is now in a retracted position, as shown in FIG. 38*d*. A retaining ring 466 is nested inside a channel 468 that has been cut around the circumference of the load pin 420 towards the inner end 407. This retaining ring 466 is configured to prevent the complete removal of the load pin 420 from the rigging plate body 401 when in the retracted position.

Figure 39:
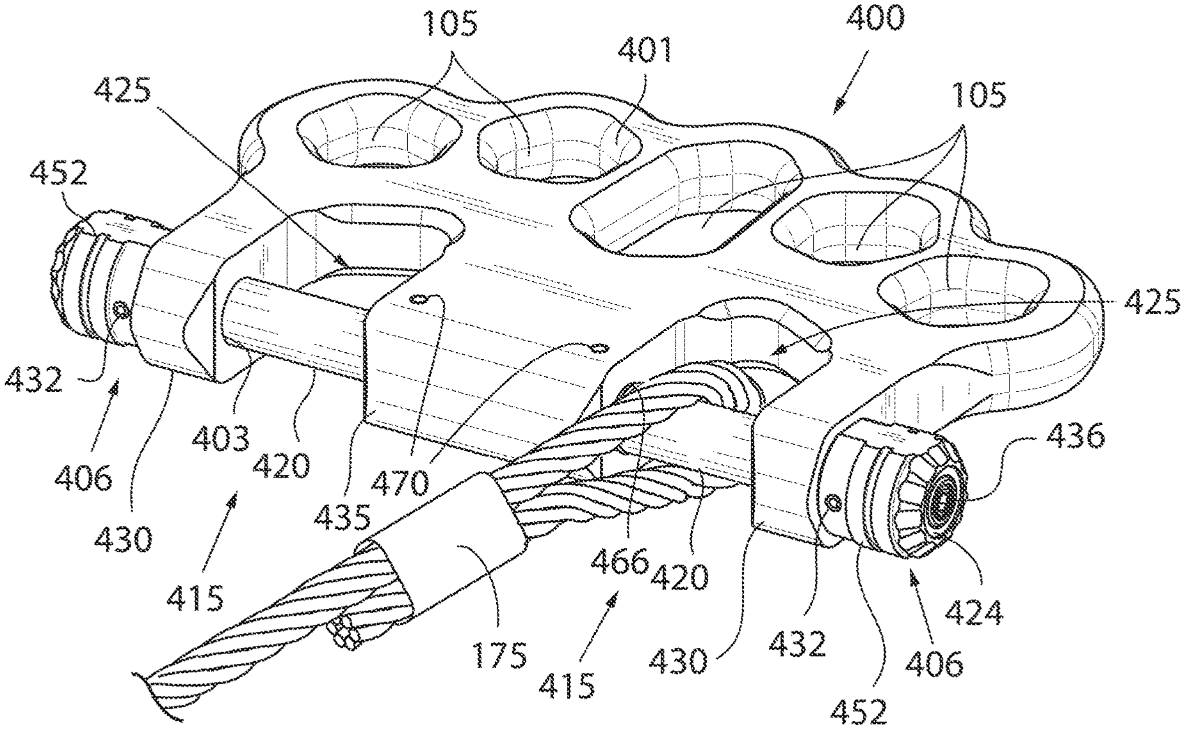
FIG. 39 is a perspective view of the rigging plate of FIG. 1 engaged with a system component.

A system component 175 is shown joined to the rigging plate 400 in FIG. 39. In order to join a system component 175 to the disclosed rigging plate 400, the load pin 420 must be in a retracted position with clearance between the end of the load pin 420 and the lock leg 435 that will allow passage of the component 175. The component 175 has a connection hole 180 and is positioned in the yoke 425 with its connection hole 180 generally in line with the load pin 420 of the disclosed rigging plate 100. The load pin 120 is then translated axially until it passes through the connection hole 180 of the component 175 and engages with the lock leg 435 of the yoke. The lock pins 470 enter and journal within the axial portion 462 of the lock slots 460 until the lock pin 170 reaches the radial portion 464 of the lock slot 460. The load pin 420 must then be caused to rotate with the lock pin 470 journaling through the radial portion 464 of the lock slot 460 until the lock ring 424 aligns with the recess 428 formed within track leg 430 of the yoke 425. Once the keyed portion 426 aligns with the recess 428, the outer biasing member 456 will cause the lock ring 424 to fall into the recess 428. In this position, the load pin 420 is not able to rotate in either direction, thereby retaining the system component 175 between the load pin 420 and yoke 425. Removal of the system component is accomplished following the steps in the preceding paragraph to create clearance between the end of the load pin 420 and the lock leg 435 of the yoke 425.

Although the invention has been herein described in what is perceived to be the most practical and preferred embodiments, it is to be understood that the invention is not intended to be limited to the specific embodiments set forth above. Rather it is recognized that modifications may be made by one of skill in the art of the invention without departing from the spirit or intent of the invention, and therefore, the invention is to be taken as including all reasonable equivalents to the subject matter of the appended claims and the description of the invention herein.

What is claimed is:

1. A securement device comprising:

a body with an upper portion and a lower portion;

a locking assembly positioned at the lower portion of the body comprising:

a load pin positioned within a yoke configured to accept a system component and secured in place by interaction of a lock pin and a lock slot; and a track pin positioned in a track slot formed along the load pin, securing the load pin on an end opposite the lock pin;

wherein a biasing member is configured to bias the load pin in a locked position and the load pin is able to move into a retracted position by moving the track pin through the track slot;

a second locking assembly comprising:

a second load pin positioned within a second yoke configured to accept the system component and secured in place by interaction of a second lock pin and a second lock slot; and a second track pin positioned in a second track slot formed along the second load pin, securing the second load pin on an end opposite the second lock pin; and wherein the biasing member is configured to bias the second load pin in a locked position and the second load pin is able to move into a retracted position by moving the second track pin through the second track slot.

2. The securement device of claim 1, wherein the load pin and the second load pin are positioned along an axis, and the biasing member is configured to bias both the load pin and the second load pin in the locked position.

3. The securement device of claim 1, wherein the load pin and the second load pin are positioned along an axis, and a second biasing member is configured to bias the second load pin in a locked position and the second load pin is able to move into a retracted position by moving the second track pin through the second track slot.

4. The securement device of claim 1, further comprising a series of linearly arranged holes along the upper portion of the securement device to form a rigging plate.

5. The securement device of claim 1, wherein the lock slot is generally J-shaped and includes a first axial portion, a radial portion, and a second axial portion.

6. The securement device of claim 1, wherein the biasing member is a spring.

7. The securement device of claim 1, wherein the load pin is secured in place by interaction of a second lock pin and a second lock slot.

8. The securement device of claim 1, wherein the load pin further comprises a pin cap secured to the end of the load pin opposite the lock pin.

9. The securement device of claim 1, wherein the yoke further comprises a lock leg and a track leg, wherein the lock pin is secured to the lock leg and the track pin is secured to the track leg.

* * * * *